US012591950B2

(12) United States Patent　　　(10) Patent No.:　US 12,591,950 B2
Pao et al.　　　　　　　　　　　(45) Date of Patent:　　Mar. 31, 2026

(54) ITERATIVELY APPLYING NEURAL NETWORKS TO AUTOMATICALLY SEGMENT OBJECTS PORTRAYED IN DIGITAL IMAGES

(71) Applicant: Adobe Inc., San Jose, CA (US)

(72) Inventors: I-Ming Pao, Palo Alto, CA (US); Zhe Lin, Fremont, CA (US); Sarah Stuckey, Petaluma, CA (US); Jianming Zhang, Campbell, CA (US); Betty Leong, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 957 days.

(21) Appl. No.: 17/584,170

(22) Filed: Jan. 25, 2022

(65) Prior Publication Data

US 2022/0148285 A1　　May 12, 2022

Related U.S. Application Data

(63) Continuation of application No. 15/967,928, filed on May 1, 2018, now Pat. No. 11,244,195.

(51) Int. Cl.
　G06T 3/4053　　(2024.01)
　G06F 18/21　　(2023.01)
　　　　(Continued)

(52) U.S. Cl.
　CPC .......... G06T 3/4053 (2013.01); G06F 18/211 (2023.01); G06F 18/217 (2023.01);
　　　　(Continued)

(58) Field of Classification Search
　CPC ....... G06T 3/4053; G06T 3/40; G06F 18/211; G06F 18/217; G06V 10/462; G06V 10/764; G06V 10/7747; G06V 10/82
　See application file for complete search history.

(56)　　　　References Cited

U.S. PATENT DOCUMENTS 5,214,744 A　　5/1993　Schweizer et al.
6,993,174 B2 *　1/2006　Fan ........................... G06T 7/11
　　　　　　　　　　　　　　　　　382/256

(Continued)

FOREIGN PATENT DOCUMENTS

CN　　106022273 A　　10/2016
CN　　106339591 A　　1/2017
　　　　(Continued)

OTHER PUBLICATIONS

Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).

(Continued)

*Primary Examiner* — Xuemei G Chen
(74) *Attorney, Agent, or Firm* — Keller Preece PLLC

(57)　　　　ABSTRACT

The present disclosure relates to systems, method, and computer readable media that iteratively apply a neural network to a digital image at a reduced resolution to automatically identify pixels of salient objects portrayed within the digital image. For example, the disclosed systems can generate a reduced-resolution digital image from an input digital image and apply a neural network to identify a region corresponding to a salient object. The disclosed systems can then iteratively apply the neural network to additional reduced-resolution digital images (based on the identified region) to generate one or more reduced-resolution segmentation maps that roughly indicate pixels of the salient object. In addition, the systems described herein can perform post-processing based on the reduced-resolution segmentation map(s) and the input digital image to accurately determine pixels that correspond to the salient object.

20 Claims, 12 Drawing Sheets

(51) Int. Cl.
    *G06F 18/211*       (2023.01)
    *G06T 3/40*         (2006.01)
    *G06V 10/46*       (2022.01)
    *G06V 10/764*     (2022.01)
    *G06V 10/774*     (2022.01)
    *G06V 10/82*       (2022.01)

(52) U.S. Cl.
    CPC ............. *G06T 3/40* (2013.01); *G06V 10/462*
      (2022.01); *G06V 10/764* (2022.01); *G06V*
      *10/7747* (2022.01); *G06V 10/82* (2022.01)

(56) References Cited

U.S. PATENT DOCUMENTS

| | | | |
|---|---|---|---|
| 7,031,519 B2* | 4/2006 | Elmenhurst ........... | G06F 18/254 |
| | | | 382/101 |
| 7,295,700 B2 | 11/2007 | Schiller et al. | |
| 7,606,417 B2* | 10/2009 | Steinberg ............. | G06V 40/165 |
| | | | 382/173 |
| 7,916,917 B2* | 3/2011 | Dewaele .............. | G06V 10/755 |
| | | | 382/128 |
| 8,600,143 B1 | 12/2013 | Kulkarni et al. | |
| 8,675,934 B2* | 3/2014 | Wehnes .................... | G06T 5/70 |
| | | | 382/128 |
| 9,251,429 B2* | 2/2016 | Pham ..................... | G06T 7/187 |
| 9,336,483 B1 | 5/2016 | Abeysooriya et al. | |
| 9,342,869 B2 | 5/2016 | Wang et al. | |
| 9,418,319 B2* | 8/2016 | Shen ................... | G06V 40/172 |
| 9,443,316 B1 | 9/2016 | Takeda et al. | |
| 9,495,756 B2* | 11/2016 | Rivet-Sabourin ..... | G06T 3/4053 |
| 9,684,967 B2* | 6/2017 | Abedini ................ | G06V 10/44 |
| 10,109,051 B1* | 10/2018 | Natesh .................. | G06V 20/10 |
| 10,192,129 B2 | 1/2019 | Price et al. | |
| 10,210,613 B2* | 2/2019 | Xu ....................... | A61B 5/4887 |
| 10,460,214 B2 | 10/2019 | Lu et al. | |
| 10,470,510 B1 | 11/2019 | Koh et al. | |
| 10,643,331 B2 | 5/2020 | Ghesu et al. | |
| 10,679,046 B1 | 6/2020 | Black et al. | |
| 10,846,566 B2* | 11/2020 | Zhu ...................... | G06F 18/254 |
| 11,282,208 B2 | 3/2022 | Cohen et al. | |
| 11,335,004 B2 | 5/2022 | Liu et al. | |
| 11,430,129 B2 | 8/2022 | Barish | |
| 11,568,627 B2 | 1/2023 | Price et al. | |
| 11,676,279 B2 | 6/2023 | Price et al. | |
| 11,875,254 B2 | 1/2024 | Rhodes et al. | |
| 2001/0051852 A1* | 12/2001 | Sundaravel ............. | H04L 67/52 |
| | | | 341/5 |
| 2003/0081833 A1* | 5/2003 | Tilton ................. | G06V 10/267 |
| | | | 382/173 |
| 2004/0042662 A1 | 3/2004 | Wilensky et al. | |
| 2004/0126013 A1* | 7/2004 | Olson ....................... | G06T 7/12 |
| | | | 382/173 |
| 2004/0190092 A1* | 9/2004 | Silverbrook ....... | H04N 1/00358 |
| | | | 358/539 |
| 2004/0202368 A1 | 10/2004 | Lee et al. | |
| 2005/0264557 A1 | 12/2005 | Kise | |
| 2006/0013455 A1* | 1/2006 | Watson ................. | G06T 7/0012 |
| | | | 382/128 |
| 2006/0015373 A1 | 1/2006 | Cuypers | |
| 2006/0045336 A1* | 3/2006 | Lim .......................... | G06T 7/12 |
| | | | 382/173 |
| 2006/0285743 A1 | 12/2006 | Oh et al. | |
| 2007/0165949 A1* | 7/2007 | Sinop ........................ | G06T 7/11 |
| | | | 382/173 |
| 2009/0003699 A1* | 1/2009 | Dugan ................ | G06F 18/2178 |
| | | | 382/173 |
| 2009/0252429 A1 | 10/2009 | Prochazka et al. | |
| 2010/0183225 A1* | 7/2010 | Vantaram ................ | G06T 7/168 |
| | | | 382/173 |
| 2010/0226566 A1 | 9/2010 | Luo et al. | |
| 2010/0322488 A1* | 12/2010 | Virtue ...................... | G06T 7/11 |
| | | | 382/128 |
| 2011/0188720 A1* | 8/2011 | Narayanan ......... | G01R 33/5608 |
| | | | 382/164 |

| | | | |
|---|---|---|---|
| 2011/0216975 A1* | 9/2011 | Rother ...................... | G06T 7/11 |
| | | | 345/428 |
| 2011/0285874 A1 | 11/2011 | Showering et al. | |
| 2012/0201423 A1 | 8/2012 | Onai et al. | |
| 2013/0182909 A1* | 7/2013 | Rodriguez-Serrano ...................... | |
| | | | G06V 30/19127 |
| | | | 382/173 |
| 2013/0223740 A1* | 8/2013 | Wang ..................... | G06T 7/143 |
| | | | 382/173 |
| 2013/0259374 A1* | 10/2013 | He ........................ | G06V 40/103 |
| | | | 382/173 |
| 2014/0007022 A1 | 1/2014 | Tocino Diaz et al. | |
| 2014/0010449 A1* | 1/2014 | Haaramo ................ | G06T 19/00 |
| | | | 382/173 |
| 2014/0056472 A1 | 2/2014 | Gu | |
| 2014/0056520 A1* | 2/2014 | Rodriguez Serrano ...................... | |
| | | | G06V 10/771 |
| | | | 382/173 |
| 2014/0247978 A1 | 9/2014 | Devin et al. | |
| 2014/0334667 A1* | 11/2014 | Eswara ................... | G06T 7/168 |
| | | | 382/103 |
| 2014/0363052 A1* | 12/2014 | Kozitsky ................ | G06V 20/62 |
| | | | 382/105 |
| 2015/0117783 A1* | 4/2015 | Lin .......................... | G06T 7/162 |
| | | | 382/195 |
| 2015/0170002 A1 | 6/2015 | Szegedy et al. | |
| 2015/0269427 A1 | 9/2015 | Kim et al. | |
| 2016/0189010 A1 | 6/2016 | Tang et al. | |
| 2016/0232425 A1 | 8/2016 | Huang et al. | |
| 2016/0358035 A1 | 12/2016 | Ruan et al. | |
| 2017/0032551 A1 | 2/2017 | Fried et al. | |
| 2017/0039723 A1* | 2/2017 | Price ...................... | G06T 7/174 |
| 2017/0068416 A1 | 3/2017 | Li | |
| 2017/0076443 A1* | 3/2017 | Ye ........................ | G06F 3/0482 |
| 2017/0103258 A1 | 4/2017 | Yu et al. | |
| 2017/0109625 A1 | 4/2017 | Dai et al. | |
| 2017/0116497 A1 | 4/2017 | Georgescu et al. | |
| 2017/0140236 A1 | 5/2017 | Price et al. | |
| 2017/0169313 A1 | 6/2017 | Choi et al. | |
| 2017/0169567 A1 | 6/2017 | Chefd'hotel et al. | |
| 2017/0213112 A1 | 7/2017 | Sachs et al. | |
| 2017/0213349 A1* | 7/2017 | Kuo ........................ | G06T 7/162 |
| 2017/0231550 A1* | 8/2017 | Do ........................ | G06T 7/0012 |
| | | | 382/128 |
| 2017/0244908 A1 | 8/2017 | Flack et al. | |
| 2017/0249739 A1* | 8/2017 | Kallenberg ....... | G06F 18/24143 |
| 2017/0287137 A1* | 10/2017 | Lin ..................... | G06V 10/454 |
| 2018/0061046 A1* | 3/2018 | Bozorgtabar ............ | G06T 7/11 |
| 2018/0108137 A1* | 4/2018 | Price ..................... | G06N 3/045 |
| 2018/0137335 A1* | 5/2018 | Kim .................... | G06V 40/19 |
| 2018/0182101 A1* | 6/2018 | Petersen ................. | G06T 7/60 |
| 2018/0240243 A1 | 8/2018 | Kim et al. | |
| 2018/0293707 A1 | 10/2018 | El-Khamy et al. | |
| 2018/0307946 A1 | 10/2018 | Kuroda et al. | |
| 2018/0365813 A1 | 12/2018 | Leong et al. | |
| 2019/0057507 A1* | 2/2019 | El-Khamy ............. | G06T 11/60 |
| 2019/0080456 A1* | 3/2019 | Song ..................... | G06T 7/174 |
| 2019/0108414 A1 | 4/2019 | Price et al. | |
| 2019/0130229 A1 | 5/2019 | Lu et al. | |
| 2019/0205606 A1* | 7/2019 | Zhou ................... | G06F 18/285 |
| 2019/0236394 A1 | 8/2019 | Price et al. | |
| 2019/0236786 A1 | 8/2019 | McNerney et al. | |
| 2019/0340462 A1 | 11/2019 | Pao et al. | |
| 2019/0357615 A1 | 11/2019 | Koh et al. | |
| 2019/0377487 A1 | 12/2019 | Bailey et al. | |
| 2020/0020108 A1 | 1/2020 | Pao et al. | |
| 2020/0143194 A1* | 5/2020 | Hou .................... | G06V 30/194 |
| 2020/0167930 A1 | 5/2020 | Wang et al. | |
| 2020/0218961 A1* | 7/2020 | Kanazawa ............. | G06N 3/045 |
| 2020/0302173 A1 | 9/2020 | Deng et al. | |
| 2020/0320273 A1* | 10/2020 | Li ........................ | G06N 3/0464 |
| 2020/0388071 A1 | 12/2020 | Grabner et al. | |
| 2021/0027098 A1 | 1/2021 | Ge et al. | |
| 2021/0082118 A1 | 3/2021 | Zhang et al. | |
| 2021/0158043 A1 | 5/2021 | Hou et al. | |
| 2021/0217178 A1 | 7/2021 | Terzopoulos et al. | |
| 2021/0248748 A1 | 8/2021 | Turgutlu et al. | |
| 2021/0290096 A1 | 9/2021 | Yang | |

(56)                   References Cited

U.S. PATENT DOCUMENTS

| | | |
|---|---|---|
| 2021/0295507 A1 | 9/2021 | Nie |
| 2022/0044366 A1 | 2/2022 | Zhang et al. |
| 2022/0044407 A1 | 2/2022 | Liu et al. |
| 2022/0108454 A1 | 4/2022 | Tsai et al. |
| 2022/0237799 A1 | 7/2022 | Price et al. |
| 2022/0262009 A1 | 8/2022 | Yu et al. |
| 2022/0292684 A1 | 9/2022 | Wang et al. |
| 2022/0375079 A1 | 11/2022 | Finley et al. |
| 2023/0281763 A1 | 9/2023 | Zhang et al. |

FOREIGN PATENT DOCUMENTS

| | | |
|---|---|---|
| CN | 107103315 A | 8/2017 |
| CN | 108345890 A | 7/2018 |
| CN | 110232689 A | 9/2019 |
| DE | 102015207047 A1 | 10/2015 |
| WO | WO 2015/177268 A1 | 11/2015 |
| WO | WO 2018/229490 A1 | 12/2018 |

OTHER PUBLICATIONS

Le, T., & Duan, Y. (2020). REDN: a recursive encoder-decoder network for edge detection. IEEE Access, 8, 90153-90164. (Year: 2020).

Zhao, H., Shi, J., Qi, X., Wang, X., & Jia, J. (2017). Pyramid scene parsing network. In Proceedings of the IEEE conference on computer vision and pattern recognition (pp. 2881-2890). (Year: 2017).

Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.

U.S. Appl. No. 17/126,986, filed Jan. 17, 2023, Notice of Allowance.

U.S. Appl. No. 17/660,361, filed Mar. 28, 2023, Notice of Allowance.

U.S. Appl. No. 17/200,525, filed Mar. 6, 2023, Office Action.

Zhang, Y., Li, X., Lin, M., Chiu, B., & Zhao, M. (2020). Deep-recursive residual network for image semantic segmentation. Neural computing and applications, 32, 12935-12947.

U.S. Appl. No. 17/200,525, filed Sep. 5, 2023, Notice of Allowance.

U.S. Appl. No. 17/655,493, filed Jul. 18, 2024, Office Action.

U.S. Appl. No. 17/584,233, filed Oct. 1, 2024, Office Action.

Ali Borji, Ming-Ming Cheng, Qibin Hou, Huaizu Jiang, and Jia Li. Salient object detection: A survey. Computational visual media, pp. 1-34, 2019.

Ali Borji and Laurent Itti. State-of-the-art in visual attention modeling. IEEE transactions on pattern analysis and machine intelligence, 35(1):185-207, 2012.

Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.

Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.

Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.

Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.

Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.

Laurent Itti, Christof Koch, and Ernst Niebur. A model of saliency-based visual attention for rapid scene analysis. IEEE Transactions on pattern analysis and machine intelligence, 20(11):1254-1259, 1998.

Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.

Dominik A Klein and Simone Frintrop. Center-surround divergence of feature statistics for salient object detection. In 2011 International Conference on Computer Vision, pp. 2214-2219. IEEE, 2011.

Philipp Krahenbuhl and Vladlen Koltun. Efficient inference in fully connected crfs with gaussian edge potentials. In Advances in neural information processing systems, pp. 109-117, 2011.

Alex Krizhevsky, Ilya Sutskever, and Geoffrey E Hinton. Imagenet classification with deep convolutional neural networks. In Advances in neural information processing systems, pp. 1097-1105, 2012.

Guanbin Li and Yizhou Yu. Visual saliency based on multi-scale deep features. In Proceedings of the IEEE conference on computer vision and pattern recognition, pp. 5455-5463, 2015.

Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.

Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.

Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.

Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.

Nian Liu and Junwei Han. Dhsnet: Deep hierarchical saliency network for salient object detection. In Proceedings of the IEEE Conference on Computer Vision and Pattern Recognition, pp. 678-686, 2016.

Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.

Jonathan Long, Evan Shelhamer, and Trevor Darrell. Fully convolutional networks for semantic segmentation. In Proceedings of the IEEE conference on computer vision and pattern recognition, pp. 3431-3440, 2015.

Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.

Robert Osserman et al. The isoperimetric inequality. Bulletin of the American Mathematical Society, 84(6):1182-1238, 1978.

Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.

Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.

Olaf Ronneberger, Philipp Fischer, and Thomas Brox. U-net: Convolutional networks for biomedical image segmentation. In Inter-

(56) References Cited

OTHER PUBLICATIONS national Conference on Medical image computing and computer-assisted intervention, pp. 234-241. Springer, 2015.

Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.

Jianping Shi, Qiong Yan, Li Xu, and Jiaya Jia. Hierarchical image saliency detection on extended cssd. IEEE transactions on pattern analysis and machine intelligence, 38(4):717-729, 2015.

Karen Simonyan and Andrew Zisserman. Very deep convolutional networks for large-scale image recognition. arXiv preprint arXiv:1409. 1556, 2014.

Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.

Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.

Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.

Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.

Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.

Yichen Wei, Fang Wen, Wangjiang Zhu, and Jian Sun. Geodesic saliency using background priors. In European conference on computer vision, pp. 29-42. Springer, 2012.

Ning Xu, Brian Price, Scott Cohen, and Thomas Huang. Deep image matting. In Proceedings of the IEEE Conference on Computer Vision and Pattern Recognition, pp. 2970-2979, 2017.

Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.

Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.

Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.

Jianming Zhang and Stan Sclaroff. Saliency detection: A boolean map approach. In Proceedings of the IEEE international conference on computer vision, pp. 153-160, 2013.

Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.

Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.

Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.

Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.

Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.

Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.

Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.

Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.

Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.

Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.

X. Bai and G. Sapiro. Geodesic matting: A framework for fast interactive image and video segmentation and matting. International Journal of Computer Vision, 82(2):113-132, 2008.

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.

L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.

R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.

L. Grady. Random walks for image segmentation. Pattern Analysis and Machine Intelligence, IEEE Transactions on, 28(11):1768-1783, 2006. Part 1.

L. Grady. Random walks for image segmentation. Pattern Analysis and Machine Intelligence, IEEE Transactions on, 28(11):1768-1783, 2006. Part 2.

V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.

G. Lin, C. Shen, I. Reid, et al. Efficient piecewise training of deep structured models for semantic segmentation. arXiv preprint arXiv:1504. 01013, 2015.

Z. Liu, X. Li, P. Luo, C. C. Loy, and X. Tang. Semantic image segmentation via deep parsing network. arXiv preprint arXiv:1509. 02634, 2015.

J. Long, E. Shelhamer, and T. Darrell. Fully convolutional networks for semantic segmentation. arXiv preprint arXiv:1411.4038, 2014.

B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.

C. Rother, V. Kolmogorov, and A. Blake. Grabcut: Interactive foreground extraction using iterated graph cuts. ACM Transactions on Graphics (TOG), 23(3):309-314, 2004.

S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.

(56) References Cited

OTHER PUBLICATIONS

Roth, H.—"DeepOrgan: Multi-level Deep Convolutional Networks for Automated Pancreas Segmentation"—Jun. 22, 2015—arXiv:1506. 06448v1, pp. 1-12.

Wang, N.—"Transferring Rich Feature Hierarchies for Robust Visual Tracking"—Apr. 23, 2015—arXiv:1501.04587v2, pp. 1-9.

Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.

D. Acuna, H. Ling, A. Kar, and S. Fidler. Efficient interactive annotation of segmentation datasets with Polygon-RNN++. In CVPR, 2018.

D. Batra, P. Yadollahpour, A. Guzman-Rivera, and G. Shakhnarovich. Diverse m-best solutions in markov random fields. In ECCV, 2012.

L. Castrejon, K. Kundu, R. Urtasun, and S. Fidler. Annotating object instances with a polygon-rnn. In IEEE CVPR, Jul. 2017.

L.-C. Chen, Y. Zhu, G. Papandreou, F. Schroff, and H. Adam. Encoder-decoder with atrous separable convolution for semantic image segmentation. arXiv preprint arXiv:1802.02611, 2018.

A. Criminisi, T. Sharp, and A. Blake. GeoS: Geodesic image segmentation. In ECCV, pp. 99-112, 2008.

M. Everingham, L. Van Gool, C. K. Williams, J. Winn, and A. Zisserman. The pascal visual object classes (VOC) challenge. IJCV, 88(2):303-338, 2010.

M. Firman, N. D. F. Campbell, L. Agapito, and G. J. Brostow. Diversenet: When one right answer is not enough. In IEEE CVPR, Jun. 2018.

D. Freedman and T. Zhang. Interactive graph cut based segmentation with shape priors. In IEEE CVPR, vol. 1, pp. 755-762. IEEE, 2005.

A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.

B. Hariharan, P. Arbelaez, L. Bourdev, S. Maji, and J. Malik. Semantic contours from inverse detectors. 2011.

K. He, X. Zhang, S. Ren, and J. Sun. Deep residual learning for image recognition. In IEEE CVPR, Jun. 2016.

Y. Hu, A. Soltoggio, R. Lock, and S. Carter. A fully convolutional two-stream fusion network for interactive image segmentation. Neural Networks, 109:31-42, 2019.

M. Kass, A. Witkin, and D. Terzopoulos. Snakes: Active contour models. IJCV, 1(4):321-331, 1988.

H. Le, L. Mai, B. Price, S. Cohen, H. Jin, and F. Liu. Interactive boundary prediction for object selection. In ECCV, Sep. 2018.

S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.

S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.

Y. Li, J. Sun, C.-K. Tang, and H.-Y. Shum. Lazy snapping. In ACM Transactions on Graphics, vol. 23, pp. 303-308, 2004.

Z. Li, Q. Chen, and V. Koltun. Interactive image segmentation with latent diversity. In IEEE CVPR, pp. 577-585, 2018.

J. H. Liew, Y. Wei, W. Xiong, S.-H. Ong, and J. Feng. Regional interactive image segmentation networks. In IEEE ICCV, Oct. 2017.

S. Mahadevan, P. Voigtlaender, and B. Leibe. Iteratively trained interactive segmentation. arXiv preprint arXiv:1805.04398, 2018.

K. Maninis, S. Caelles, J. Pont-Tuset, and L. Van Gool. Deep extreme cut: From extreme points to object segmentation. In IEEE CVPR, 2018.

K. McGuinness and N. E. OConnor. Toward automated evaluation of interactive segmentation. Computer Vision and Image Understanding, 115(6):868-884, 2011.

E. N. Mortensen and W. A. Barrett. Intelligent scissors for image composition. In Proceedings of the 22nd annual conference on Computer graphics and interactive techniques, pp. 191-198, 1995.

J. Redmon, S. Divvala, R. Girshick, and A. Farhadi. You only look once: Unified, real-time object detection. In Proceedings of the IEEE conference on computer vision and pattern recognition, pp. 779-788, 2016.

S. Ren, K. He, R. Girshick, and J. Sun. Faster r-cnn: Towards real-time object detection with region proposal networks. In Advances in neural information processing systems, pp. 91-99, 2015.

O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.

S. Vicente, V. Kolmogorov, and C. Rother. Graph cut based image segmentation with connectivity priors. In IEEE CVPR, pp. 1-8. IEEE, 2008.

N. Xu, B. Price, S. Cohen, J. Yang, and T. S. Huang. Deep interactive object selection. In IEEE CVPR, pp. 373-381, Mar. 13, 2016.

K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.

B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.

Everingham, M. and VanGool, L. and Williams, C. K. I. and Winn, J. and Zisserman, A.; "The PASCAL Visual Object Classes Challenge 2007," (VOC2007) Results, Nov. 8, 2007, available at http://host.robots.ox.ac.uk/pascal/VOC/voc2007/.

Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405. 0312v3 [cs.CV], 15 pages.

Gao Huang, Zhuang Liu, Kilian Q. Weinberger, and Laurens V.D. Maaten; "Densely connected convolutional networks," In arXiv:1608. 06993v3, 2016.

C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.

Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).

Kamat, S. P.; Control Theory and Informatics, vol. 2, No. 1, 2012 Digital Image Processing for Camera Application in Mobile Devices using Artificial Neural Networks, pp. 11-17.

IEEE Conference on Computer Vision and Pattern Recognition (CVPR), 2016, Liang Chieh Chen et al, "Attention to Scale: Scale-Aware Semantic Image Segmentation", pp. 3640-3649 abstract 1. 7-9 and p. 2 left column, 1st paragraph starting at "In particular . . . ", 1. 4-7, Sec. 3.1, Fig. 5 column (c).

IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.

Chen, Liang-Chieh et al. "Rethinking Atrous Convolution for Semantic Image Segmentation." ArXiv abs/1706.05587 (2017): n. pag.

M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.

Combined Search and Examination Report as received in UK application GB1915436.8 dated Aug. 12, 2020.

Combined Search & Examination Report as received in UK application GB1813276.1 dated Feb. 14, 2019.

Intention to Grant as received in UK application GB1915436.8 dated Aug. 25, 2021.

(56)                References Cited

OTHER PUBLICATIONS

Zhang et al. in U.S. Appl. No. 16/988,055, filed Aug. 7, 2020, entitled Generating an Image Mask for a Digital Image by Utilizing a Multi-Branch Masking Pipeline With Neural Networks.
Li et al., Interactive Image Segmentation with Latent Diversity, 2018, IEEE 2575-7075/18, DOI 10.11/09/CVPR. 2018.00067, pp. 577-585. (Year: 2018).
Xu et al., Deep Interactive Object Selection, Mar. 13, 2016 arXiv:1603. 04042v1 [cs.CV], pp. 1-9. (Year: 2016).
Guo, Z.—"Deep Learning-Based Image Segmentation on Multimodal Medical Imaging"—IEEE—Mar. 1, 2019—pp. 162-169 ( Year: 2019).
Wang, G.—"Interactive Medical Image Segmentation using Deep Learning with Image-specific Fine-tuning"—arXiv—Oct. 11, 2017— pp. 1-11 (Year: 2017).
Guo, Z.—"Medical Image Segmentation Based on Multi-Modal Convolutional Neural Network: Study on Image Fusion Schemes"— arXiv—Nov. 2, 2017—pp. 1-10 (Year: 2017).
Examination Report as received in Australian application 2019250107 dated Oct. 14, 2021.
Examination Report as received in Australian application 2019250107 dated Nov. 5, 2021.
Notice of Grant as received in UK application GB1813276.1 dated Oct. 12, 2021.
U.S. Appl. No. 14/945,245, filed Sep. 21, 2017, Preinterview 1st Office Action.
U.S. Appl. No. 14/945,245, filed Nov. 1, 2017, 1st Action Office Action.
U.S. Appl. No. 14/945,245, filed Apr. 17, 2018, Office Action.
U.S. Appl. No. 14/945,245, filed Sep. 12, 2018, Notice of Allowance.
U.S. Appl. No. 16/216,739, filed Feb. 25, 2021, Preinterview 1st Office Action.
U.S. Appl. No. 16/216,739, filed Apr. 5, 2021, 1st Action Office Action.
U.S. Appl. No. 16/216,739, filed Sep. 13, 2021, Office Action.
U.S. Appl. No. 16/216,739, filed Dec. 23, 2021, Notice of Allowance.
U.S. Appl. No. 15/799,395, filed Mar. 14, 2019, Office Action.
U.S. Appl. No. 15/799,395, filed Jul. 12, 2019, Notice of Allowance.
U.S. Appl. No. 15/967,928, filed Dec. 10, 2020, Preinterview 1st Office Action.
U.S. Appl. No. 15/967,928, filed Apr. 2, 2021, 1st Action Office Action.
U.S. Appl. No. 15/967,928, filed May 13, 2021, Office Action.
U.S. Appl. No. 15/967,928, filed Sep. 29, 2021, Notice of Allowance.
U.S. Appl. No. 16/231,746, filed Feb. 18, 2021, Preinterview 1st Office Action.
U.S. Appl. No. 16/231,746, filed Jun. 11, 2021, 1st Action Office Action.
U.S. Appl. No. 16/231,746, filed Nov. 10, 2021, Notice of Allowance.
U.S. Appl. No. 16/988,408, filed Oct. 5, 2021, Preinterview 1st Office Action.

U.S. Appl. No. 16/988,408, filed Nov. 24, 2021, 1st Action Office Action.
U.S. Appl. No. 16/988,408, filed Jan. 5, 2022, Notice of Allowance.
U.S. Appl. No. 16/376,704, filed Dec. 29, 2021, Preinterview 1st Office Action.
U.S. Appl. No. 16/376,704, filed Feb. 7, 2022, 1st Action Office Action.
U.S. Appl. No. 16/216,739, Feb. 25, 2021, Preinterview 1st Office Action.
U.S. Appl. No. 15/7967,928, filed Dec. 10, 2020, Preinterview 1st Office Action/
U.S. Appl. No. 15/7967,928, filed Apr. 2, 2021, 1st Action Office Action.
U.S. Appl. No. 15/7967,928, filed May 13, 2021, Office Action.
U.S. Appl. No. 15/7967,928, filed Sep. 29, 2021, Notice of Allowance.
Chang, Yong et al. "Accurate pelvis and femur segmentation in hip CT with a novel patch-based refinement." IEEE journal of biomedical and health informatics 23.3 (2018): 1192-1204. (Year: 2018).
Costea, Arthur Daniel, Andra Petrovai, and Sergiu Nedevschi. "Fusion scheme for semantic and instance-level segmentation." 2018 21st International Conference on Intelligent Transportation Systems (ITSC). IEEE, 2018. (Year: 2018).
Zhou, Peng, et al. "Deepstrip: High-resolution boundary refinement. " Proceedings of the IEEE/CVF conference on computer vision and pattern recognition. 2020. (Year: 2020).
U.S. Appl. No. 17/585,140, filed Mar. 27, 2024, Notice of Allowance.
U.S. Appl. No. 17/584,233, filed Apr. 11, 2024, Office Action.
U.S. Appl. No. 16/376,704, filed Oct. 4, 2022, Notice of Allowance.
U.S. Appl. No. 17/660,361, filed Dec. 8, 2022, Office Action.
U.S. Appl. No. 16/376,704, filed Jun. 14, 2022, Office Action.
U.S. Appl. No. 17/126,986, filed Aug. 30, 2022, Office Action.
U.S. Appl. No. 17/655,493, filed Nov. 14, 2024, Notice of Allowance.
Notice of Grant as received in Australian application 2019250107 dated Mar. 17, 2022.
Office Action as received in CN application 201910967936.4 dated Jun. 5, 2024.
Office Action as received in CN application 201810886944.1 dated Apr. 8, 2023.
He et al. in Guided Image Filtering, IEEE Transactions On Pattern Analysis and Machine Intelligence, vol. 35, 2013.
He et al. in Fast Guided Filter, Computer Vision and Pattern Recognition, arXiv:1505.00996, 2015.
Ning Xu et al., "Deep GrabCut for Object Selection," published Jul. 14, 2017.
Yang et al., Meticulous Object Segmentation, Dec. 13, 2020, available at https://arxiv.org/pdf/2012.07181.pdf.
Office Action as received in CN application 201810886944.1 dated Dec. 29, 2023.
U.S. Appl. No. 17/584,233, filed Feb. 27, 2025, Office Action.
U.S. Appl. No. 18/161,666, filed Sep. 24, 2025, Office Action.
U.S. Appl. No. 17/584,233, filed Aug. 7, 2025, Office Action.
U.S. Appl. No. 18/161,666, filed Jan. 6, 2026, Notice of Allowance.
U.S. Appl. No. 17/584,233, filed Dec. 10, 2025, Office Action.

* cited by examiner

800

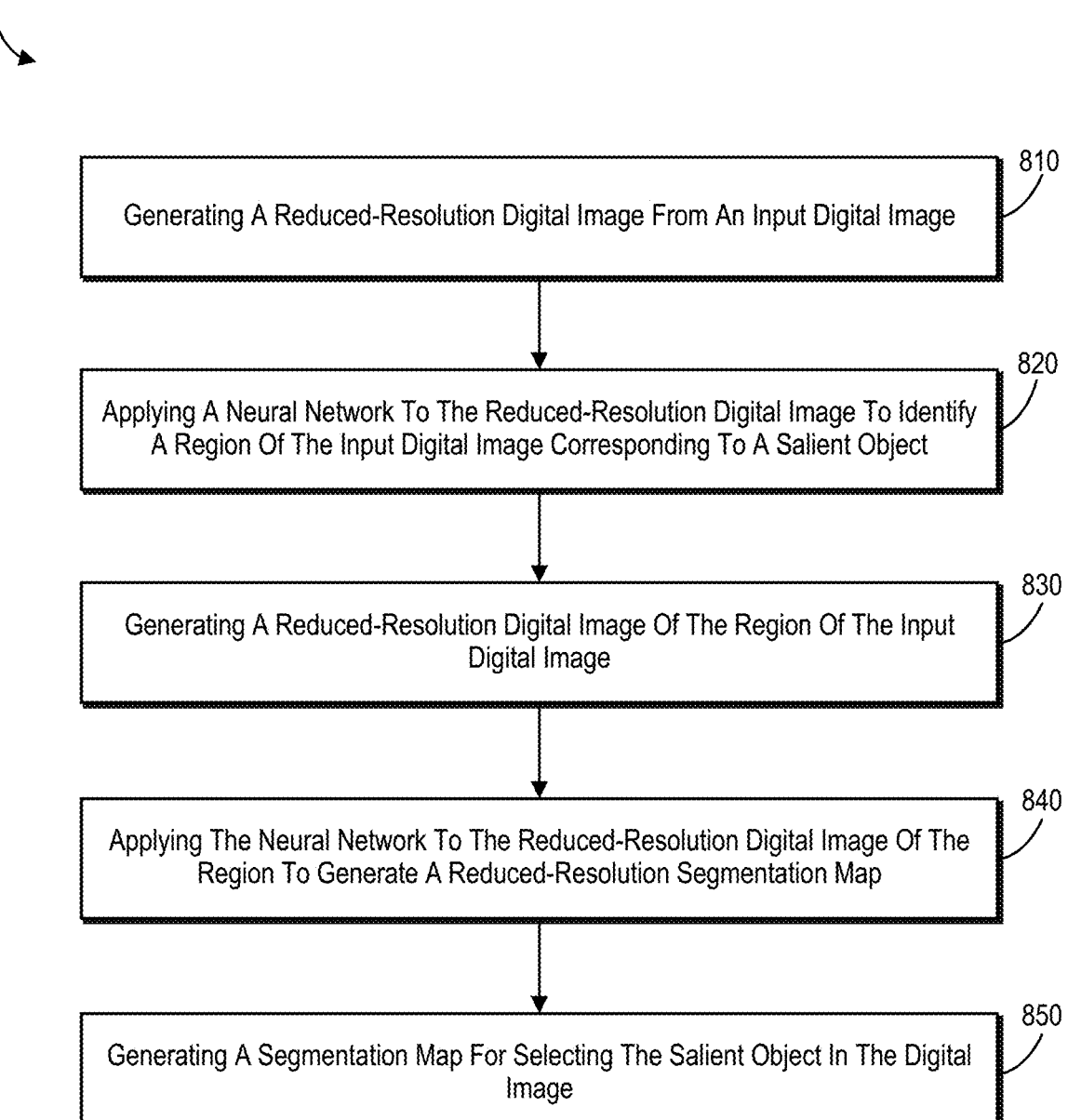

810

Generating A Reduced-Resolution Digital Image From An Input Digital Image

820

Applying A Neural Network To The Reduced-Resolution Digital Image To Identify A Region Of The Input Digital Image Corresponding To A Salient Object

830

Generating A Reduced-Resolution Digital Image Of The Region Of The Input Digital Image

840

Applying The Neural Network To The Reduced-Resolution Digital Image Of The Region To Generate A Reduced-Resolution Segmentation Map

850

Generating A Segmentation Map For Selecting The Salient Object In The Digital Image

Computing Device
900

Processor
902

Memory
904

Storage
906

I/O Interface
908

Communication Interface
910

ITERATIVELY APPLYING NEURAL NETWORKS TO AUTOMATICALLY SEGMENT OBJECTS PORTRAYED IN DIGITAL IMAGES

CROSS-REFERENCE TO RELATED APPLICATIONS

The present application is a continuation of U.S. application Ser. No. 15/967,928, filed on May 1, 2018. The aforementioned application is hereby incorporated by reference in its entirety.

BACKGROUND

Recent years have seen a precipitous rise in the use of client computing devices (e.g., mobile devices, personal computers) to capture, store, and edit digital media. Indeed, it is now common for consumer electronic devices to provide access to media editing software that enables users to interact with and edit digital media in a variety of ways. For example, conventional media systems often include features or tools that utilize user interactions to identify displayed objects within an image and enable a user to select the identified object in further interactions with the image. In particular, conventional media systems can analyze user interactions with a digital image to identify pixels that make up an object within an image.

While conventional object detection and selection systems provide useful tools for identifying objects portrayed within images and enabling users to interact with the identified objects, these systems still include a variety of problems and drawbacks. For example, conventional systems are often inefficient and consume significant processing resources to operate effectively. Indeed, with more image capturing devices capturing and storing high quality images having a high-resolution of pixels, conventional systems for analyzing and identifying pixels of objects portrayed within the high-resolution images require significant computer resources and processing time to accurately identify pixels corresponding to objects portrayed within the high-resolution images. To illustrate, conventional systems that utilize machine learning techniques can exhaust processing power of client computing devices and require significant time to accurately identify objects within digital images.

In addition, conventional systems are often expensive and inflexible. For instance, many conventional systems implement a guided identification process in which a user manually indicates a region of a digital image in which an object is portrayed. Based on the user-input (e.g., tracing aro and an object or clicks inside of the object), the conventional system can identify the object within the digital image. While user-input can facilitate a more accurate analysis of the image, many conventional systems rigidly require user input to accurately identify objects in digital images. Moreover, user-input is often imprecise and frequently introduces errors when guiding an analysis of the image. Furthermore, by requiring user input, conventional systems further increase time required to identify objects in digital images.

These and other problems exist with regard to analyzing digital images and identifying pixels of a salient object portrayed therein.

SUMMARY

Embodiments of the present disclosure provide benefits and/or solve one or more of the foregoing and other problems in the art with systems, methods, and non-transitory computer readable media that iteratively apply a neural network to a digital image at a reduced resolution to automatically identify pixels of salient objects portrayed within the digital image. In particular, in one or more embodiments, the disclosed systems provide a fully automatic salient object selection tool by iteratively applying a convolutional neural network to reduced-resolution digital images generated from an input high-resolution digital image. Moreover, the disclosed systems can implement intelligent post-processing techniques that analyze low resolution selections and high-resolution digital images to output an accurate selection of at the original image resolution. In this manner, the disclosed systems can increase accuracy (e.g., iteratively analyzing regions of the input digital image), improve flexibility (e.g., autonomously identify pixels without guided manual input), and increase efficiency (e.g., reduce computing resources when analyzing high resolution digital images) relative to conventional systems.

To illustrate, in one or more embodiments, the disclosed systems generate a reduced-resolution digital image from an input digital image. Moreover, the disclosed systems can apply a neural network to the reduced-resolution digital image to identify a region of the input digital image in which a salient object is portrayed. The disclosed systems can further generate a reduced-resolution digital image of the identified region and apply the neural network to the reduced-resolution digital image of the region to generate a reduced-resolution segmentation map of the salient object. Based on the reduced-resolution segmentation map and the input digital image, the disclosed systems can generate a segmentation map (i.e., a high-resolution segmentation map at the resolution of the input digital image) that identifies pixels within the input digital image corresponding to the salient object.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which:

FIG. 8 illustrate a flow diagram of an example series of acts for identifying pixels of a salient object portrayed within a digital image in accordance with one or more embodiments.

DETAILED DESCRIPTION

Figure 1:
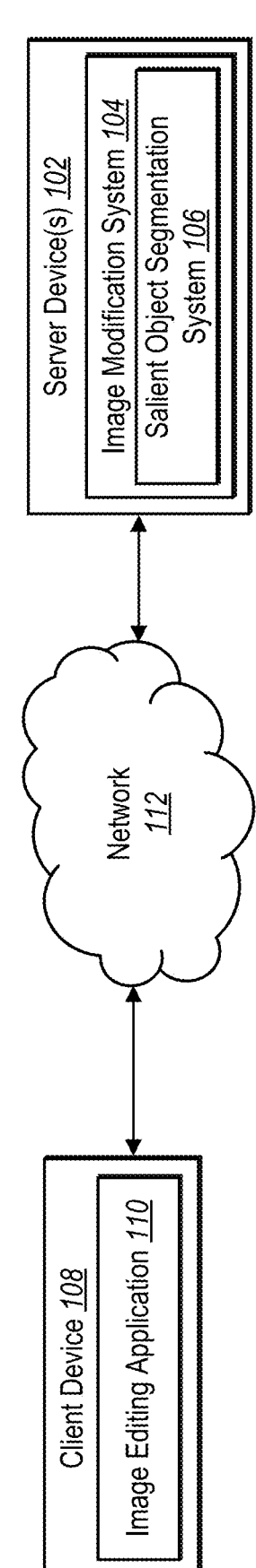
FIG. 1 illustrates a block diagram of an environment in which a salient object segmentation system is implemented in accordance with one or more embodiments.

One or more embodiments of the present disclosure include a salient object segmentation system that iteratively applies neural networks to digital images at reduced resolutions to identify pixels of one or more salient objects portrayed within the digital image. In particular, without user input indicating an object portrayed in a digital image, the salient object segmentation system can efficiently and automatically generate a segmentation map that accurately identifies pixels of a salient object within the digital image. Indeed, in one or more embodiments, the salient object segmentation system iteratively applies a convolution neural network to a number of reduced-resolution digital images from an input image to generate a reduced-resolution segmentation map. In addition, the salient object segmentation system can process (e.g., post-process) the reduced-resolution segmentation map in view of the input digital image to generate a segmentation map having a resolution corresponding to the input digital image. The salient object segmentation system can then utilize the segmentation map to identify and manipulate pixels of the input digital image that portray the salient object.

To illustrate, in one or more embodiments, the salient object segmentation system generates a reduced-resolution digital image from an input digital image portraying a salient object. The salient object segmentation system can further identify a region of the input digital image corresponding to the salient object by applying a neural network (e.g., a convolutional neural network) to the reduced-resolution digital image. Based on the identified region, the salient object segmentation system can generate a reduced-resolution digital image of the identified region (e.g., a reduced-resolution, zoomed-in portion of the input digital image). The salient object segmentation system can additionally apply the neural network to the reduced-resolution digital image of the region to generate a reduced-resolution segmentation map that includes an indication of pixels within the reduced-resolution digital image of the region corresponding to the salient object. The salient object segmentation system can further perform post-processing based on the reduced-resolution segmentation map and the input digital image to generate a segmentation map of the salient object having a resolution corresponding to the input digital image.

As just mentioned, the salient object segmentation system can generate a reduced-resolution digital image from an input digital image. In one or more embodiments, the salient object segmentation system generates the reduced-resolution digital image by down-sampling the input digital image to have a lower pixel resolution than the input digital image. In one or more embodiments, the salient object segmentation system down-samples (or otherwise modifies the input digital image) to have a pre-defined pixel resolution corresponding to specifications of a computing device and/or specifications of a neural network.

As discussed, the salient object segmentation system can also apply a neural network to the reduced-resolution digital image. In particular, the salient object segmentation system can apply a neural network trained to analyze a digital image and determine pixels of the digital image corresponding to a salient object. For example, the salient object segmentation system can apply a neural network to the reduced-resolution digital image to identify pixels of the salient object and generate an initial segmentation map for the reduced-resolution digital image. Specifically, the salient object segmentation system can generate a segmentation map that reflects a mapping of pixels within the reduced-resolution digital image that portray the salient object.

Based on the initial segmentation map, the salient object segmentation system can identify a region of the input digital image that portrays the salient object. For instance, the salient object segmentation system can identify a bounding rectangle or square within the input digital image that encompasses pixels portraying the salient object. The salient object segmentation system can then focus analysis of the input image to the identified region of the input digital image.

For example, upon identifying the region of the input digital image corresponding to the salient object portrayed within the input digital image, the salient object segmentation system can generate a second reduced-resolution digital image for the identified region. To illustrate, the salient object segmentation system can identify a portion of the input digital image corresponding to the region and down-sample the identified portion of the input digital image to generate the second reduced-resolution digital image for the identified region.

The salient object segmentation system can then apply the neural network to the second reduced-resolution digital image for the identified region. Indeed, the salient object segmentation system can apply the neural network to the second reduced-resolution digital image to generate a reduced-resolution segmentation map of the salient object. In this manner, the salient object segmentation system can generate a reduced-resolution segmentation map that reflects a mapping of pixels of the reduced-resolution digital image of the region corresponding to the salient object.

The salient object segmentation system can utilize the reduced-resolution segmentation map to identify pixels of the input digital image that correspond to the salient object. For example, in one or more embodiments, the salient object segmentation system performs one of a variety of post-processing techniques to generate a (high-resolution) segmentation map based on both the input digital image and the reduced-resolution segmentation map of the salient object. In particular, the salient object segmentation system can post-process the reduced-resolution segmentation map by applying one or more filters (e.g., a dense conditional random field (CRF) filter, a guided filter, a graph cut filter) to up-sample the reduced-resolution segmentation map and generate the (high-resolution) segmentation map. For example, the salient object segmentation system can utilize the one or more filters to refine pixel labels of the salient object, generate a border mask, and refine pixels around detected edges of the salient object (e.g., within the border mask). As will be described in further detail below, the salient object segmentation system can implement post-processing techniques to generate a segmentation map having a resolution corresponding to the resolution of the input digital image.

As mentioned above, the salient object segmentation system can identify pixels of an input digital image corresponding to a salient object by iteratively applying a neural network to reduced-resolution digital images. Indeed, the salient object segmentation system can iteratively apply the neural network to reduced-resolution digital images corresponding to any number of identified regions within the input digital image. As an example, in one or more embodiments, the salient object segmentation system can identify sub-regions of the digital image (e.g., sub-regions with a lower confidence, accuracy, or granularity). The salient object segmentation system can generate refined segmentation maps by applying the neural network to these sub-regions (i.e., reduced-resolution digital images portraying the sub-regions). In this manner, the salient object segmentation system can refine the segmentation map to more accurately indicate pixels corresponding to the salient object.

The salient object segmentation system provides a number of advantages over conventional systems for identifying and facilitating selection of objects portrayed within digital images. For example, by iteratively applying the neural network to regions of the input digital image at reduced resolutions, the salient object segmentation system more efficiently analyzes an input digital image and significantly reducing consumption of processing resources. Indeed, by limiting the digital image to a particular region at reduced resolution that the salient object segmentation system analyzes, one or more embodiments described herein improve functionality of a computing system (e.g., a client device and/or server device) by substantially reducing the amount of analysis performed over conventional systems.

In addition, by iteratively applying the neural network to regions and sub-regions of the digital image, the salient object segmentation system can more accurately identify pixels of an input digital image across a wide range of pixel resolutions. Indeed, by down-sampling or otherwise modifying the input digital image to generate a reduced-resolution digital image, the salient object segmentation system can efficiently identify pixels of the input digital image without substantially sacrificing accuracy in correctly identifying pixels that make up the salient object within the input digital image. Thus, one or more embodiments of the salient object segmentation system described improve accuracy and efficiency in identifying and facilitating modification of pixels of a salient object portrayed within a digital image.

Moreover, by applying the convolutional network to the reduced-resolution digital images and further processing (e.g., post-processing) the resulting segmentation map, the salient object segmentation system facilitates identifying pixels of a salient object by further improving flexibility. Indeed, in one or more embodiments, the salient object segmentation system identifies pixels portraying salient objects without requiring a user to manually guide the object selection process. For example, by utilizing a neural network to generate a reduced-resolution segmentation map of the image and post-processing the reduced-resolution segmentation map to generate a post-processed segmentation map having a resolution corresponding to the input digital image, the salient object segmentation system can identify and fine-tune pixels within the input digital image that make up the salient object portrayed within the input digital image. Thus, one or more embodiments of the salient object segmentation system facilitate accurate identification of pixels of the salient object without requiring the time-consuming (and often frustrating) process of manually indicating the salient object portrayed within the input digital image.

As illustrated by the foregoing discussion, the present disclosure utilizes a variety of terms to describe features and advantages of the salient object segmentation system. Additional detail is now provided regarding the meaning of such terms. For instance, as user herein, a "digital image" refers to any digital symbol, picture, icon, or illustration. For example, the term digital image includes digital files with the following file extensions: JPG, TIFF, BMP, PNG, RAW, or PDF. Thus, a digital image includes digital data or a digital file for an image that is displayable via a graphical user interface of a display of a computing device. A digital image may have a corresponding resolution (e.g., pixel resolution) associated with a number of pixels that collectively make up the displayable content of the digital image. As an example, a digital image having a 1920×1080 resolution refers to a digital image having a width of 1920 pixels and a height of 1080 pixels, or a 2.1 megapixel digital image. It will be understood that digital images can have a wide variety of resolutions, sizes, or pixel dimensions. In addition to pixel data, a digital image may include data or information about the digital image file (e.g., metadata).

As used herein, a "reduced-resolution digital image" refers to a digital image having a lower resolution than an input digital image. In particular, a reduced-resolution digital image includes a digital image based on an original or previous iteration of a digital image (e.g., an input image) having a lower pixel resolution than the digital image on which the reduced-resolution digital image is based. For example, in one or more embodiments, a reduced-resolution digital image refers to a down-sampled version (or copy of) an input digital image. To illustrate, in one or more embodiments, a reduced-resolution digital image of a 10-megapixel digital image may refer to a 320×320 pixel down-sampled copy of the 10-megapixel image.

In one or more embodiments, a reduced-resolution digital image refers to a full or partial reduced-resolution version or copy of a digital image having a higher resolution than the reduced-resolution digital image. For example, in one or more embodiments described herein, a reduced-resolution digital image of an input digital image refers to a copy of an entire input digital image at a lower resolution than the input digital image. In addition, a reduced-resolution digital image of a region of a digital image may refer to a zoomed-in portion, a cropped image, or discrete region of the digital image at a lower-resolution than the input digital image. To illustrate, where an identified region refers to a one-megapixel portion (e.g., a 1000×1000 pixel region) of a larger 10-megapixel input digital image, a reduced-resolution digital image of the region may refer to a 320×320 pixel down-sampled copy of the identified region.

In one or more embodiments, the salient object segmentation system applies a neural network to one or more reduced-resolution digital images. As used herein, a "neural network" refers to a machine learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network is an algorithm that implements deep learning techniques, i.e., machine learning that utilizes a set of algorithms to attempt to model high-level abstractions in data.

In one or more embodiments described herein, the salient object segmentation system applies a convolutional neural network trained to identify pixels of a salient object portrayed within the digital image. In particular, in one or more embodiments, the convolutional neural network analyzes a digital image, determines a confidence score for pixels of the digital image, and determines whether a pixel corresponds to a salient object based on the determined confidence scores.

In utilizing the convolutional neural network to identify pixels of the salient object, in one or more embodiments, the salient object segmentation system can generate a segmentation map. As used herein, a "segmentation map" refers to a mapping of pixels of a digital image portraying an object. In particular, a segmentation map includes a representation of a digital image (or reduced-resolution digital image) in which pixels that reflect a salient object are indicated (e.g., a heat map, an object mask). For example, in one or more embodiments, a segmentation map includes a matrix of values (e.g., binary values or confidence values) indicating foreground (salient object pixels) and background pixels. Similarly, a segmentation map can include a black and white digital image mask (e.g., in which white pixels correspond to pixels of the salient object and black pixels correspond to background pixels of a corresponding digital image). In one or more embodiments described herein, a segmentation map for a corresponding digital image has a pixel resolution that corresponds to a resolution of the corresponding digital image (or corresponding region of the digital image). For instance, a segmentation map including pixels of the salient object input digital image may have a similar pixel resolution as the input digital image. Similarly, a reduced-resolution segmentation map generated based on a reduced-resolution digital image may have a similar pixel resolution as the reduced-resolution digital image.

Additional detail will now be provided regarding the salient object segmentation system in relation to illustrative figures portraying exemplary embodiments. For example, FIG. 1 illustrates an example environment 100 for analyzing digital images to identify pixels of salient objects in accordance with one or more embodiments described herein. As shown in FIG. 1, the environment 100 includes a server device(s) 102 including an image modification system 104 and a salient object segmentation system 106. The environment 100 further includes a client device 108 (e.g., a user device) including an image editing application 110 thereon.

As shown in FIG. 1, the server device(s) 102 and client device 108 can communicate with each other directly or indirectly through the network 112. The network 112 may include one or multiple networks and may use one or more communication platforms or technologies suitable for transmitting data. In one or more embodiments, the network 112 includes the Internet or World Wide Web. In addition, or as an alternative, the network 112 can include other types of communication networks as described below (e.g., in relation to FIG. 9).

Moreover, the client device 108 may refer to various types of computing devices. For example, the client device 108 may include a mobile device such as a mobile telephone, a smartphone, a PDA, a tablet, or a laptop. Additionally, or alternatively, the client device 108 may include a non-mobile device such as a desktop computer. In addition, as mentioned above, the environment 100 includes the server device(s) 102. The server device(s) 102 can generate, store, receive, and/or transmit any type of data, including one or more input digital images. The server device(s) 102 can send and receive data to the client device 108. In one or more embodiments, the server device(s) 102 comprises a data server. The server device(s) 102 can also comprise communication servers or web-hosting servers. Additional detail regarding client devices and server devices is provided below (e.g., in relation to FIG. 9).

In addition, as shown in FIG. 1, the server device(s) 102 can include an image modification system 104 that implements at least a portion of the salient object segmentation system 106. For example, the image modification system 104 can store one or more digital images and provide image editing capabilities to a user of the client device 108. In addition, the salient object segmentation system 106 can provide features related to identifying pixels of a salient object portrayed within a digital image in accordance with one or more embodiments described herein.

As shown in FIG. 1, the image modification system 104 and salient object segmentation system 106 are implemented on the server device(s) 102. In one or more embodiments, the image modification system 104 and/or salient object segmentation system 106 can be implemented in whole (or in part) on the client device 108. For example, in one or more embodiments, some or all features of the image modification system 104 and salient object segmentation system 106 are implemented as part of a local image editing application 110 installed on the client device 108. Nonetheless, for the sake of explanation, FIG. 1 illustrates an example embodiment in which the image modification system 104 and salient object segmentation system 106 are implemented on the server device(s) 102.

By way of example, the server(s) 102 can receive a digital image from the client device 108. In response, the salient object segmentation system 106 (via the server(s) 102) can identify pixels of a salient object portrayed within the digital input image. For example, as mentioned above, the salient object segmentation system 106 can iteratively apply a convolutional neural network to reduced-resolution digital images corresponding to regions (and/or sub-regions) of an input digital image. Utilizing the convolutional neural network the salient object segmentation system 106 can identify a reduced-resolution segmentation map that includes an accurate approximation of pixels corresponding to a salient object within the input digital image. In addition, the salient object segmentation system 106 can perform post-processing (e.g., apply a post-processing filter) on the reduced-resolution segmentation map to generate a segmentation map having a resolution corresponding to the input digital image and which accurately identifies pixels of the salient object within the input digital image.

Upon identifying the pixels of the salient object (e.g., after generating a segmentation map), the salient object segmentation system 106 can modify selected pixels of the input digital image to generate a modified digital image in which the pixels of the salient object are differentiated from other pixels within the modified digital image. In this way, a user of the client device 108 can interact with the modified digital image to select the salient object and move, edit, or otherwise interact with the pixels of the salient object in a variety of ways. For instance, the image editing application 110 can enable a user to isolate a background of the image for editing (e.g., edit all pixels other than the pixels of the salient object), move the portrayal of the salient object to another image (e.g., without including any pixels from the background of the image), or otherwise interact with the pixels of the salient object as identified by the salient object segmentation system 106 in accordance with one or more embodiments described herein.

As mentioned above, the salient object segmentation system 106 can identify pixels of a salient object by generating a segmentation map of an input digital image. Specifically, the salient object segmentation system 106 can generate a reduced-resolution segmentation map by iteratively applying a convolutional neural network to a reduced-resolution digital image and applying one or more post-processing techniques to the reduced-resolution segmentation map to generate a segmentation map that identifies pixels of the input digital image corresponding to the salient object portrayed therein. For example, FIG. 2 illustrates identifying pixels of an input digital image in accordance with one or more embodiments.

Figure 2:
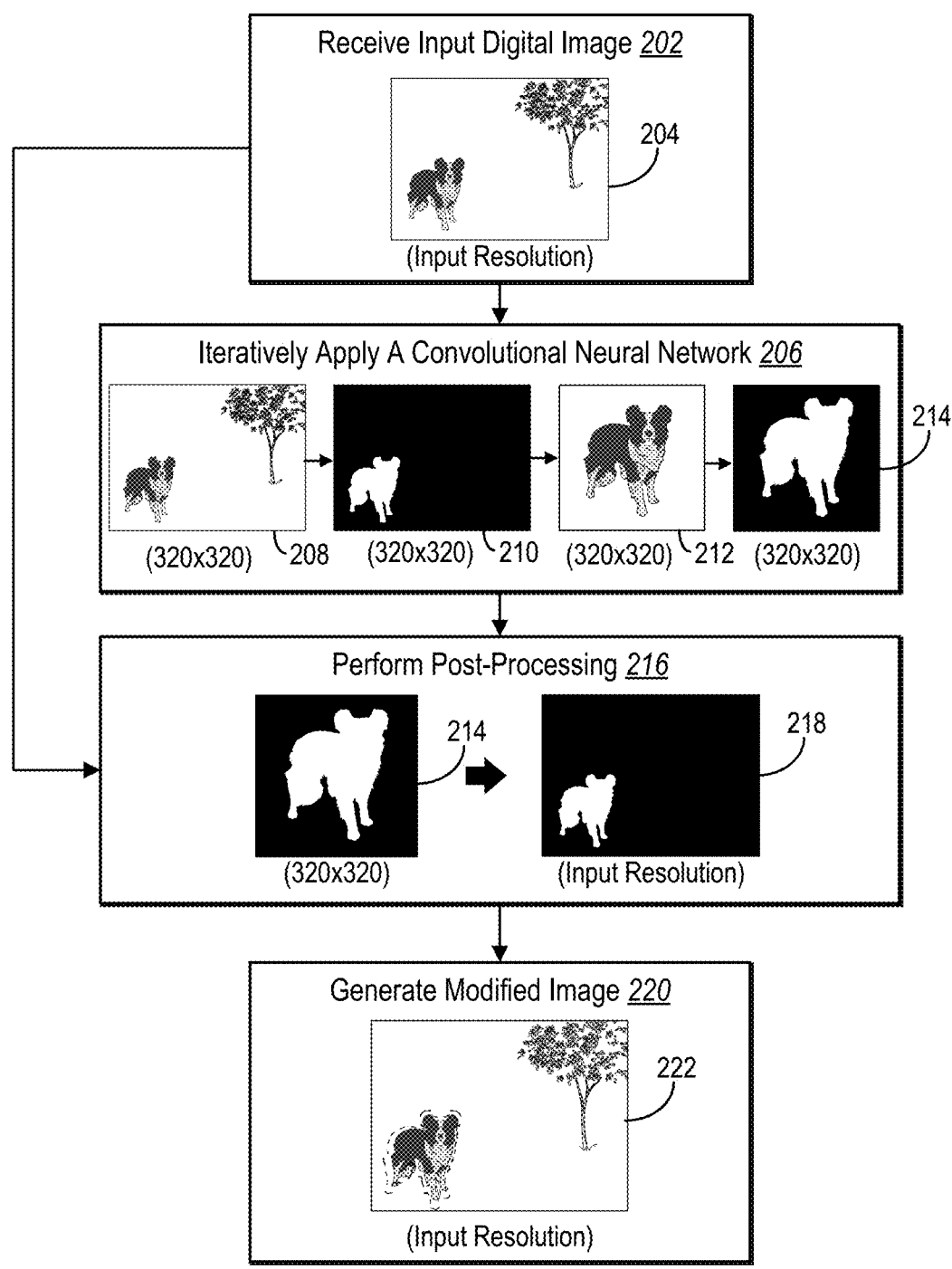
FIG. 2 illustrates an example workflow for identifying pixels of a salient object within a digital image in accordance with one or more embodiments.

In particular, as shown in FIG. 2, the salient object segmentation system 106 performs an act 202 of receiving an input digital image 204 (e.g., from a client device 108) having an input resolution. In particular, the salient object segmentation system 106 receives, identifies, or otherwise accesses an input digital image 204 having a resolution corresponding to an original resolution of the image when captured by an image capturing device (e.g., the client device 108). The input digital image 204 may refer to an original digital image or copy (e.g., a high-resolution copy) of an original digital image stored on the client device 108 and/or server device(s) 102. As shown in FIG. 2, the input digital image 204 portrays one or more salient objects (e.g., a dog, a tree).

As shown in FIG. 2, the salient object segmentation system 106 can perform an act 204 of iteratively applying a convolutional neural network to one or more reduced-resolution digital images of the input digital image. For example, in one or more embodiments, the salient object segmentation system 106 generates a reduced-resolution digital image 208 having a lower resolution (e.g., 320×320 pixels) than the input digital image 204. In one or more embodiments, the salient object segmentation system 106 generates the reduced-resolution digital image 208 by down-sampling the input digital image 204 to a predetermined resolution (e.g., a resolution corresponding to specifications of the convolutional neural network and/or processing capabilities of the client device 108).

Upon generating the reduced-resolution digital image 208, the salient object segmentation system 106 can apply the convolutional neural network to the reduced-resolution digital image 208 to identify pixels of a salient object (e.g., the dog) and generate an initial segmentation map 210 (e.g., a reduced-resolution segmentation map). Specifically, the salient object segmentation system 106 can generate a segmentation map that includes a mapping of pixels corresponding to one or more salient objects identified within the reduced-resolution digital image 208. For example, as shown in FIG. 2, the initial segmentation map 210 includes an identification of pixels corresponding to the salient object within the reduced-resolution digital image 208. For ease in explanation, the salient object segmentation system 106 identifies a single salient object (e.g., the dog). Alternatively, in one or more embodiments and in accordance with training of the convolutional neural network, the salient object segmentation system 106 may identify multiple salient objects (e.g., dog, tree) and generate a reduced-resolution that includes a mapping of pixels for the multiple salient objects.

As further shown in FIG. 2, based on the initial segmentation map 210 the salient object segmentation system 106 identifies a region of the input digital image 204 that includes the salient object. Moreover, based on the identified region, the salient object segmentation system 106 can generate a reduced-resolution digital image of the region 212 including a zoomed-in or cropped portion of the input digital image 204 down-sampled to a lower pixel resolution (e.g., 320×320 pixels) than the resolution of a corresponding region of the input digital image 204. For example, where the region of the input digital image 204 may include 1000×1000 pixels, the reduced-resolution digital image of the region 212 may include 320×320 pixels.

In addition, the salient object segmentation system 106 can again apply the convolutional neural network to the reduced-resolution digital image of the region 212 to generate a reduced-resolution segmentation map of the region 214 having a similar resolution (e.g., 320×320 pixels) as the reduced-resolution digital image of the region 212. Indeed, in one or more embodiments, each of the reduced-resolution digital image 208, the reduced-resolution segmentation map 210, the reduced-resolution digital image of the region 212, and the reduced-resolution segmentation map of the region 214 may have a similar resolution based on specifications of the convolutional neural network, user settings, and/or processing capabilities or resources of a computing device (e.g., client device 108, server device(s) 102) on which the salient object segmentation system 106 is implemented. In addition, while one or more embodiments described herein specifically describe applying the convolutional neural network to 320×320 pixel reduced-resolution digital images, the salient object segmentation system 106 can similarly apply the convolutional neural network to reduced-resolution digital images having a variety of pixel resolutions.

As further shown in FIG. 2, the salient object segmentation system 106 can perform an act 216 of post-processing. In particular, the salient object segmentation system 106 can perform post-processing on one or more of the reduced-resolution segmentation maps to generate a segmentation map having a resolution corresponding to the resolution of the input digital image 204. In particular, as shown in FIG. 2, the salient object segmentation system 106 perform post-processing by generating a segmentation map 218 (e.g., an up-sampled segmentation map) of the salient object based on the reduced-resolution segmentation map of the region 214 and the input digital image 204. For example, the salient object segmentation system 106 can generate the segmentation map 218 by up-sampling the reduced-resolution segmentation map of the region 214 while applying one or more filters that refine pixel labels of the segmentation map 218, generate a border mask around identified pixels of the salient object, and further refine pixel labels around detected edges within the border of the salient object. In one or more embodiments, the salient object segmentation system 106 generates the segmentation map 218 by applying a dense conditional random filter (CRF) filter to one or both of the reduced-resolution segmentation maps 210, 214. In addition, or as an alternative, the salient object segmentation system 106 can apply a guided filter or a graph cut filter when generating the segmentation map 218 having a resolution corresponding to the input digital image 204.

Upon generating the segmentation map 218 of the input digital image 204, the salient object segmentation system 106 can further perform an act 220 of generating a modified digital image 222. In particular, the salient object segmentation system 106 can generate the modified digital image 222 by modifying pixels of the input digital image 204 corresponding to the salient object as identified within the segmentation map 218. For instance, the salient object segmentation system 106 can group the identified pixels of the salient object to enable a user of the client device 108 to interact with the pixels of the salient object (e.g., to edit or otherwise modify a display of the input image on a graphical user interface of the client device 108).

Figure 3A:
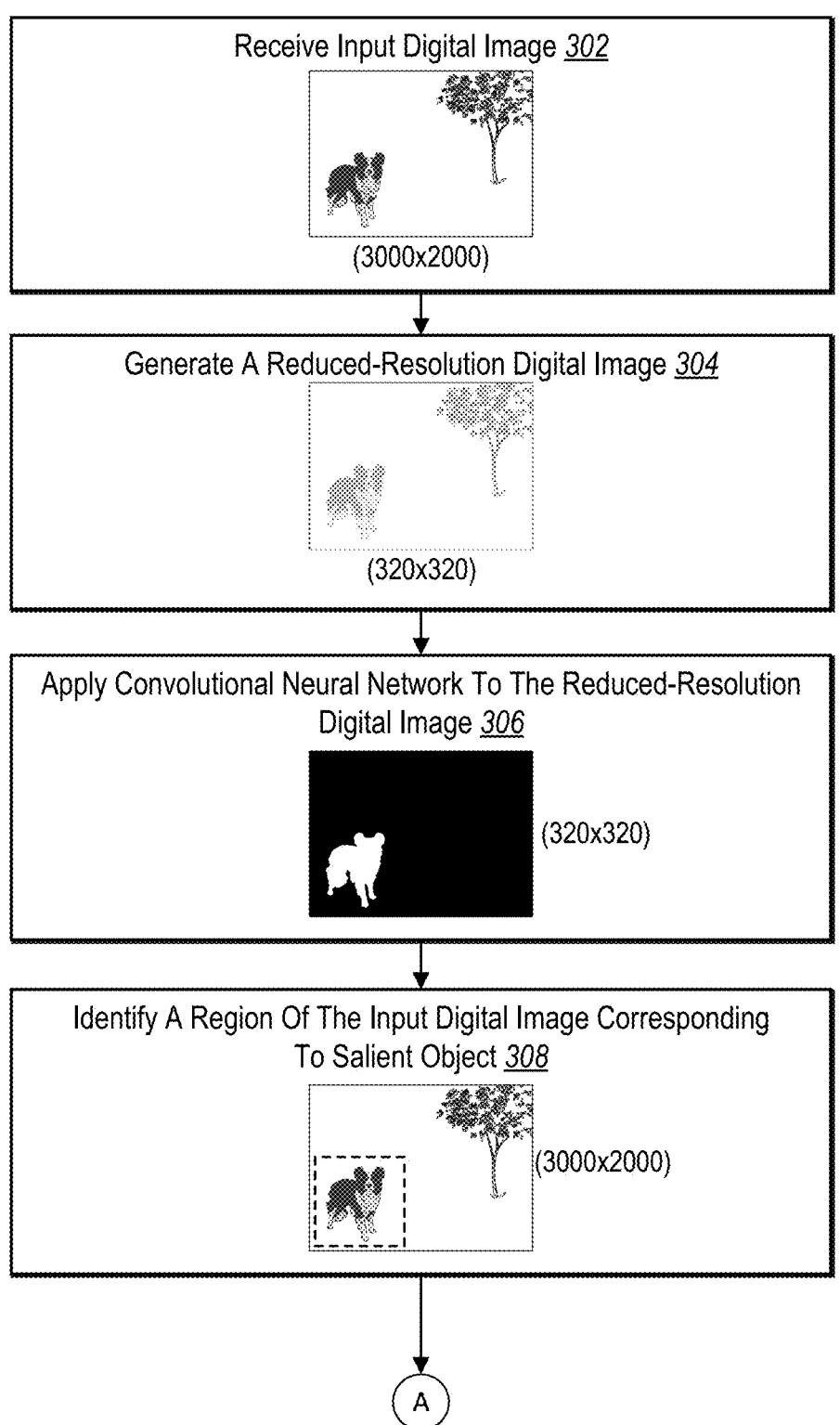
FIGS. 3A-3D illustrate more detailed workflows for identifying pixels of a salient object within a digital image in accordance with one or more embodiments.
Figure 3B:
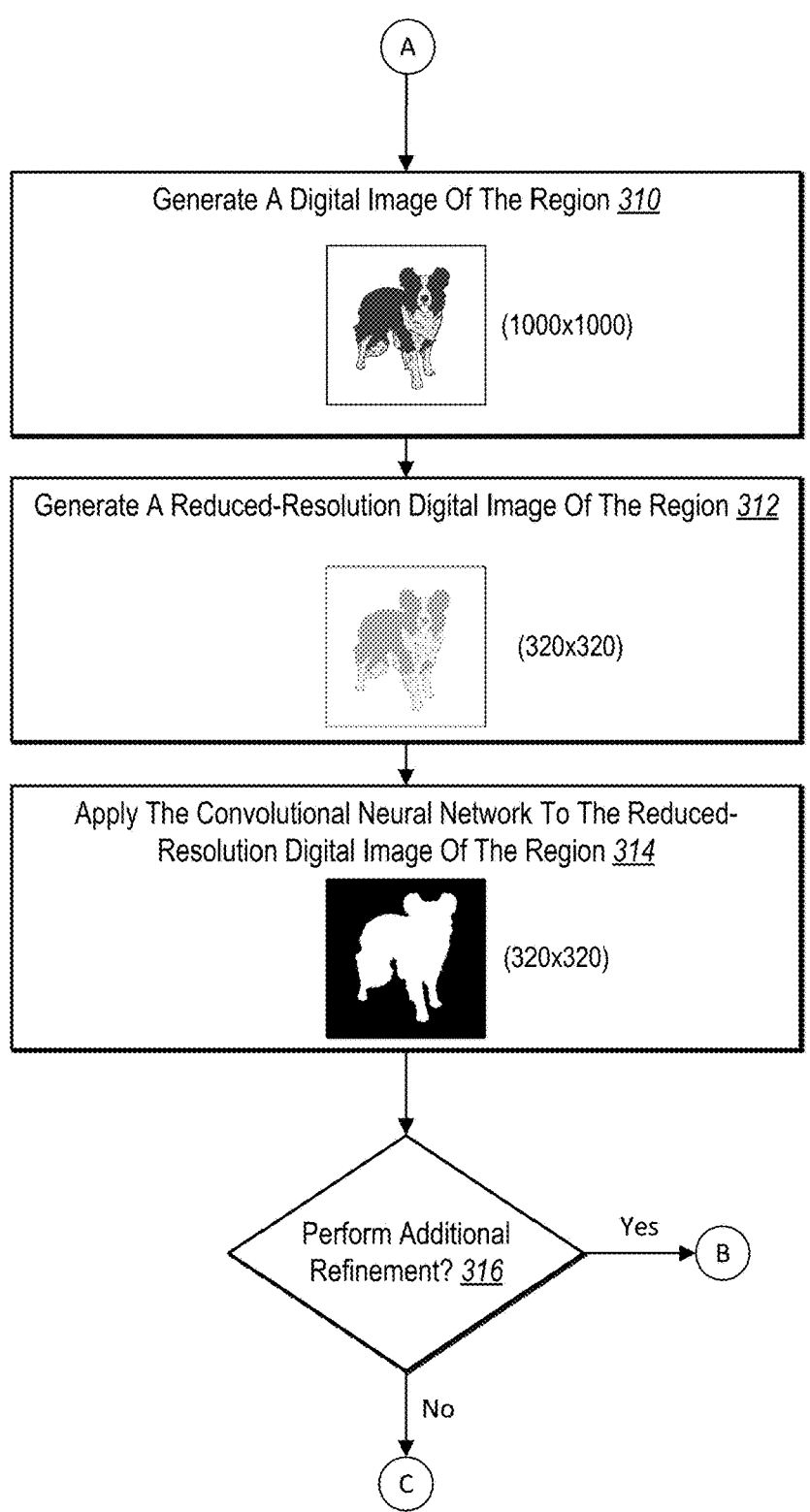
Figure 3C:
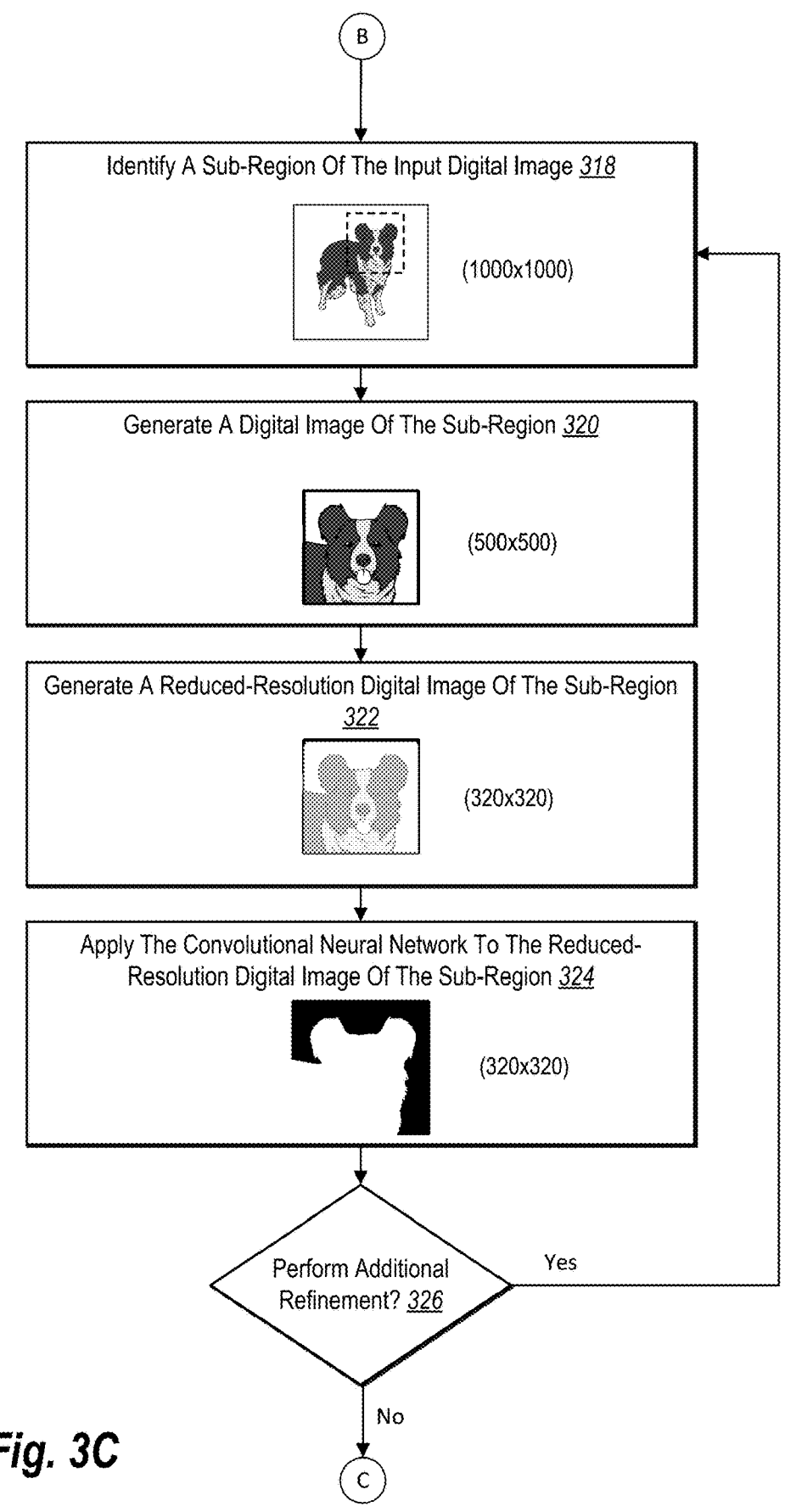
Figure 3D:
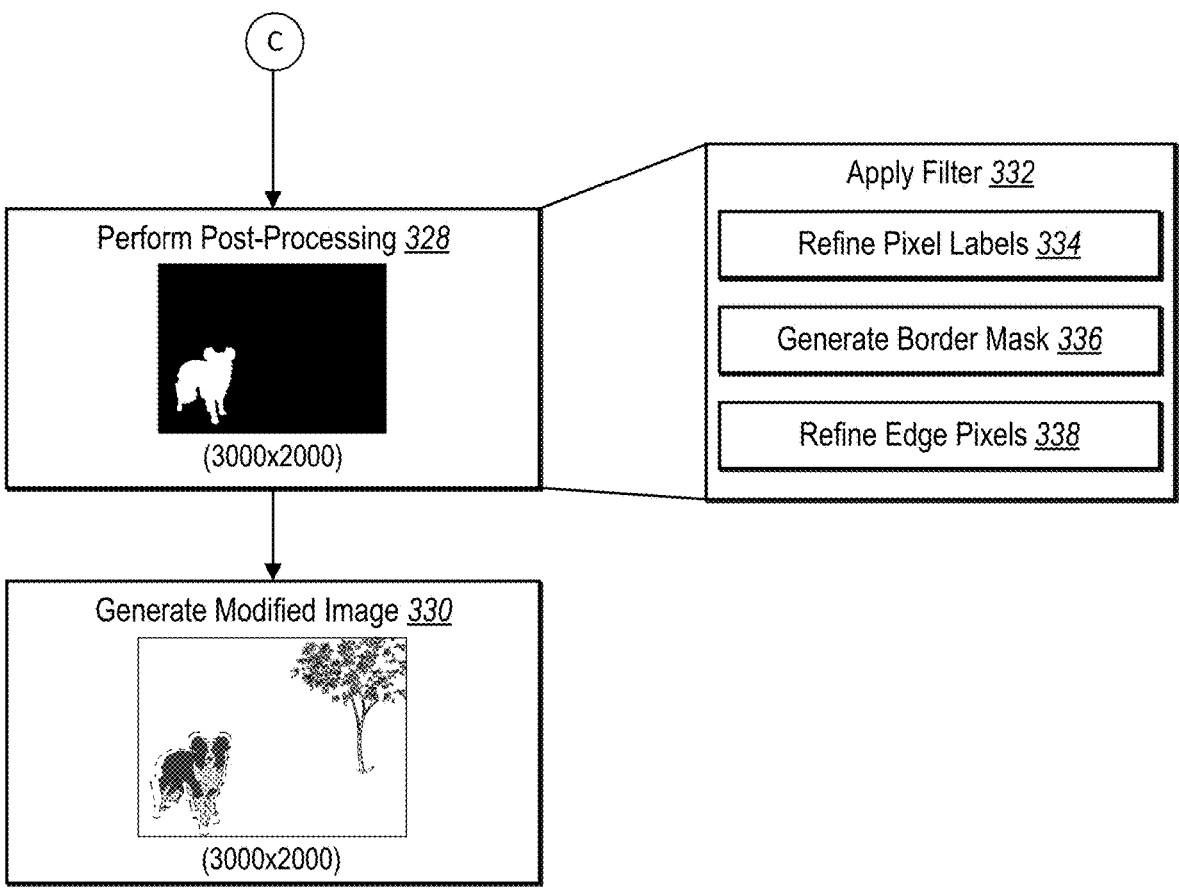

Additional detail with regard to identifying pixels of an input digital image and generating a modified digital image will now be provided in connection with FIGS. 3A-3D. In particular FIG. 3A illustrates utilizing a convolutional neural network to identify a region corresponding to a salient object, FIG. 3B illustrates applying a convolutional neural network to a reduced resolution digital image of the region, FIG. 3C illustrates identifying and applying a convolutional neural network to a sub-region of the digital image, and FIG. 3D illustrates post-processing and generating a modified digital image.

For instance, as shown in FIG. 3A, the salient object segmentation system 106 performs an act 302 of receiving an input digital image. In particular, in relation to the embodiment of FIG. 3A, the salient object segmentation system 106 receives, accesses, or otherwise identifies an input digital image having a 3000×2000 resolution (e.g. 6 megapixels). Alternatively, the salient object segmentation system 106 can receive an input digital image having a higher or lower pixel resolution based on a number and dimension of pixels of the input digital image.

As shown in FIG. 3A, the salient object segmentation system 106 can perform an act 304 of generating a reduced-resolution digital image. For example, as shown in FIG. 3A, the salient object segmentation system 106 down-samples the input digital image to a lower resolution (e.g., 320×320 pixels) than a resolution (e.g., an original or captured image resolution) of the input digital image. The salient object segmentation system 106 can apply one or a combination of various down-sampling techniques (e.g., nearest neighbor, bilinear, Fourier transform, edge-preservation, vectorization, etc.) to generate the reduced-resolution digital image. In one or more embodiments, the salient object segmentation system 106 down-samples the input digital image or otherwise generates the reduced-resolution digital image to a predetermined resolution based on specifications of a convolutional neural network. For instance, where a convolutional neural network is specifically trained to analyze and identify pixels of digital images having a pixel resolution of 320×320, the salient object segmentation system 106 can generate a reduced-resolution having a 320×320 resolution including a mapping of the identified pixels.

As further shown in FIG. 3A, the salient object segmentation system 106 can perform an act 306 of applying a convolutional neural network to the reduced-resolution digital image to identify pixels of the reduced-resolution digital image corresponding to a salient object portrayed within the reduced-resolution digital image. For instance, the salient object segmentation system 106 can apply a convolutional neural network trained to detect or otherwise identify a salient object portrayed therein and further determine which pixels of the reduced-resolution digital image correspond to the salient object.

As mentioned above, in one or more embodiments, the salient object segmentation system 106 trains the convolutional neural network to identify pixels corresponding to a salient object in a digital image. For example, the salient object segmentation system 106 can train the convolutional neural network to determine confidence scores associated with pixels of an associated digital image to aid the convolutional neural network in predicting or otherwise determining whether each of the pixels correspond to the salient object portrayed within the digital image. Examples of convolutional neural networks may include a DeepLab neural network, a GoogleNet neural network, and/or a DenseNet neural network trained to identify pixels of a salient object portrayed in a digital image. In one or more embodiments, the salient object segmentation system utilizes a convolutional neural network including similar features and functionality as the salient content neural network described in "Deep Salient Content Neural Networks for Efficient Digital Object Segmentation" by Lu et al., filed as U.S. application Ser. No. 15/799,395, and which is incorporated by reference in its entirety.

As mentioned above, the object segmentation system 106 can train the convolutional neural network based on a plurality of training images and associated segmentation maps (or identification of pixels) for objects portrayed therein. Indeed, by analyzing training images and associated segmentation maps that are known to include accurate identifications of pixels corresponding to objects portrayed therein, the object segmentation system 106 can fine-tune the convolutional neural network to accurately identify objects and identify pixels therein. In particular, based the training images and segmentation maps, the object segmentation system 106 can train the convolutional neural network to identify objects, identify pixels within the object, identify pixels around a boundary of objects and further determine which pixels correspond to edges of identified objects. While one or more embodiments described herein indicate that the object segmentation system 106 trains the convolutional neural network, in one or more embodiments, the object segmentation system 106 receives a trained convolutional neural network from a third-party device (e.g., a training server device).

In addition to identifying pixels of an object portrayed within a digital image, the object segmentation system 106 can train the convolutional neural network (or receive a trained convolutional neural network) to perform a number of functions. For example, the object segmentation system 106 can train the convolutional neural network to detect one or more salient objects. In addition, the object segmentation system 106 can train the convolutional neural network to identify pixels of salient objects. The object segmentation system 106 can further train the convolutional neural network to generate a segmentation map including a representation of the identified pixels of the salient object(s). Indeed, in one or more embodiments, the object segmentation system 106 trains the convolutional network to perform any number of functions including detecting a salient object, identifying pixels of the salient object, and/or generate a segmentation map in accordance with one or more embodiments described herein.

In the example shown in FIG. 3A, the salient object segmentation system 106 applies the convolutional neural network to the reduced-resolution digital image to predict (e.g., based on determined confidence scores for the pixels of the reduced-resolution digital image) or otherwise determine which pixels of the reduced-resolution digital image correspond to the salient object. For instance, the salient object segmentation system 106 may determine that any pixel having a confidence value that exceeds a threshold confidence value corresponds to the salient object portrayed within the reduced-resolution digital image. As will be described in further detail below, the salient object segmentation system 106 may utilize one or more of the confidence values in generating a segmentation map for the input digital image.

As mentioned above, by applying the convolutional neural network to the reduced-resolution digital image, the salient object segmentation system 106 can generate an initial segmentation map including an indication of pixels of the salient object distinguished from other pixels within the reduced-resolution digital image (e.g., based on confidence values). In particular, as shown in FIG. 3A, the salient object segmentation system 106 can generate an initial segmentation map having a reduced pixel resolution corresponding to the reduced (e.g., down-sampled) resolution of the reduced-resolution digital image based on the input digital image. As an example, and not by way of limitation, the initial segmentation map may include a mask (or heat map) including a binary (e.g., black and white) representation of the reduced-resolution digital image in which the salient object is denoted by white pixels with other pixels (e.g., background pixels) being denoted by black pixels.

As shown in FIG. 3A, the salient object segmentation system 106 can further perform the act 308 of identifying a region of the input digital image corresponding to the salient object. In particular, in one or more embodiments, the salient object segmentation system 106 identifies a region of the initial segmentation map including each of the pixels of the salient object. Based on the identified region of the initial segmentation map, the salient object segmentation system 106 can identify a corresponding region of the input digital image projected to include each of the identified pixels corresponding to the salient object portrayed therein.

In one or more embodiments, the salient object segmentation system 106 identifies a region by generating a bounding box that forms a rectangle or square around the salient object. For example, the salient object segmentation system 106 can identify a region by identifying a smallest possible bounding box (e.g., a square or rectangular region of the input digital image) projected to include each of the pixels of the salient object as identified within the initial segmentation map. In some embodiments, the salient object segmentation system 106 identifies a region utilizing a buffer or threshold around the pixels corresponding to the salient object (e.g., pixels within a bounding box that is at least twenty pixels larger than the boundary of the salient object).

In one or more embodiments, the salient object segmentation system 106 identifies the region based on proportional dimensions of the initial segmentation map. For example, where the identifies pixels of the salient object within the initial segmentation map having 320×320 pixel dimensions are bounded within an 80×80 pixel box, the salient object segmentation system 106 can identify a proportionally higher resolution box within the input digital image corresponding to a pixel ratio between the reduced-resolution initial segmentation map and the input digital image. For instance, where the input digital image has a pixel resolution four-times larger than the pixel resolution of the initial segmentation map, the salient object segmentation system 106 may identify a corresponding region of the input digital image similarly including four-times as many pixels as the identified region of the initial segmentation map.

Proceeding onto FIG. 3B, the salient object segmentation system 106 performs an act 310 of generating a digital image of the region. For example, in one or more embodiments, the salient object segmentation system 106 generates the digital image of the region by cropping the input digital image based on the identified region to generate a digital image having a pixel resolution corresponding to a resolution of the input digital image. In particular, in one or more embodiments, the salient object segmentation system 106 generates a digital image of the region including a similar density of pixels as the input digital image. For instance, where the input digital image has a 3000×2000 resolution, the generated digital image of the region (which includes only a portion of the input digital image that portrays the salient object) may have a 1000×1000 resolution.

As further shown in FIG. 3B, the salient object segmentation system 106 generates a down-sampled digital image of the region. In particular, the salient object segmentation system 106 can down-sample or otherwise reduce a resolution of the digital image of the region similar to the process described above when generating the reduced-resolution digital image from the input digital image. As shown in FIG. 3B, the salient object segmentation system 106 performs an act 312 of generating a reduced-resolution digital image of the region (e.g., a reduced resolution digital image having the same resolution as the reduced-resolution digital image described above). Similar to the act 304 of generating the reduced-resolution digital image above, the salient object segmentation system 106 can perform the act 312 of generating the reduced-resolution digital image of the region to have a predetermined resolution based on one or more user settings, processing capabilities of a client device 108, and/or specifications of the convolutional neural network. In other embodiments, the salient object segmentation system 106 can generate a reduced-resolution digital image of the region having a different resolution.

Even in embodiments where the reduced-resolution digital images having the same resolution (e.g., 320×320), the reduced-resolution digital image generated in the act 312 is more detailed. Indeed, because the reduced-resolution digital image of the region (in the act 312) portrays a smaller portion of the input digital image than the reduced-resolution digital image (in the act 304) based on the larger portion of the input digital image, the reduced-resolution digital image of the region provides a more detailed representation of the region of the image than the previously generated reduced-resolution digital image. Therefore, the reduced-resolution digital image of the region (in the act 312) includes more pixels associated with the salient object than reduced-resolution digital image (in the act 304) based on the larger portion of the input digital image.

As shown in FIG. 3B, the salient object segmentation system 106 can also perform the act 314 of applying the convolutional neural network to the reduced-resolution digital image of the region to identify pixels of the reduced-resolution digital image corresponding to the salient object portrayed therein. Similar to applying the convolutional network mentioned above, applying the convolutional neural network to the reduced-resolution digital image of the region can similarly cause the salient object segmentation system 106 to generate a reduced-resolution segmentation map. As shown in FIG. 3B, the reduced-resolution segmentation map of the region can have a similar resolution (e.g., 320×320 pixels) as the reduced-resolution digital image of the region. In other embodiments, the resolutions can be different.

As discussed above, the salient object segmentation system 106 can apply the convolutional neural network to determine confidence scores associated with pixels of the reduced-resolution digital image of the region that the salient object segmentation system 106 utilizes to generate the reduced-resolution segmentation map of the region. Further, because the reduced-resolution segmentation map includes a more detailed representation of the identified region (and more accurately identifies pixels of the salient object than the initial reduced-resolution segmentation map), the salient object segmentation system 106 can determine more accurate confidence with respect to the reduced-resolution segmentation map of the region.

As mentioned above, the salient object segmentation system 106 can iteratively apply the convolutional neural network to multiple reduced-resolution digital images corresponding to respective regions of the input digital image to refine identification of pixels of the salient object portrayed within the input image. As shown in FIG. 3B, in one or more embodiments, the salient object segmentation system 106 performs an act 316 of determining whether to perform additional refinement to the reduced-resolution segmentation map. In particular, in one or more embodiments, the salient object segmentation system 106 determines whether to perform one or more additional iterations of applying the convolutional neural network to reduced-resolution digital images of regions (or sub-regions) of the input digital image prior to performing post-processing of the reduced-resolution segmentation map including the identification of pixels of the salient object.

The salient object segmentation system 106 can determine whether to perform additional refinement in a number of ways. In particular, the salient object segmentation system 106 may determine whether to perform additional refinement based on a number of factors or characteristics with regard to subsequent iterations of applying the convolutional neural network to identify regions of the input digital image corresponding to a salient object portrayed therein. For ease in explanation, additional detail with regard to determining whether to perform additional refinement is provided in connection with reference 326 shown in FIG. 3C below, which may include similar features as determining whether to perform additional refinement shown in FIG. 3B.

As shown in FIG. 3B, if the salient object segmentation system 106 determines that additional refinement is needed (or otherwise appropriate), the salient object segmentation system 106 proceeds to perform additional refinement on the reduced-resolution segmentation map, as denoted by reference B, and shown in further detail in connection with FIG. 3C. Alternatively, if the salient object segmentation system 106 determines that additional refinement is not needed (or otherwise appropriate), the salient object segmentation system 106 proceeds to perform post-processing on the reduced-resolution segmentation map, as denoted by reference C, and shown in further detail in connection with FIG. 3D.

In particular, as shown in FIG. 3C, where the salient object segmentation system 106 determines to perform additional refinement, the salient object segmentation system 106 performs an act 318 of identifying a sub-region of the input digital image on which additional refinement is needed. For example, the salient object segmentation system 106 may identify a sub-region of the reduced-resolution segmentation map of the region based on confidence values. To illustrate, the salient object segmentation system 106 can identify a sub-region within which a number of pixels of the reduced-resolution digital image of the region have low confidence values (e.g., confidence values below a threshold confidence value). For instance, in the example shown in FIG. 3C, the salient object segmentation system 106 determines that particular pixels (e.g., pixels that portray the dog's head) have lower confidence values than other regions of pixels within the reduced-resolution segmentation map. Accordingly, the salient object segmentation system identifies a sub-region of the input-digital image that corresponds to the particular pixels (i.e., pixels that portray the dog's head).

Similar to the act 310 described above (for generating a digital image of a region), the salient object segmentation system 106 can perform an act 320 of generating a digital image of the sub-region. As shown in FIG. 3B, the digital image of the sub-region includes a cropped portion of the input digital image corresponding to the identified sub-region. The generated digital image of the sub-region may have a similar pixel density as the input digital image. By way of example, where the digital image of the region has a 1000×1000 pixel resolution, the identified sub-region may have a 500×500 pixel resolution which includes a zoomed-in portion of the input digital image that portrays the dog's head.

As further shown in FIG. 3C, the salient object segmentation system 106 can perform an act 322 of generating a reduced-resolution digital image of the sub-region. The salient object segmentation system 106 can generate the reduced-resolution digital image of the sub-region by down-sampling the digital image of the sub-region using a similar process as described above (e.g., in relation to the act 312). As shown in FIG. 3C, the reduced-resolution digital image of the sub-region has a similar pixel resolution (e.g., 320× 320 pixels) as the resolutions of the previously described reduced-resolution digital images. In generating each of the reduced-resolution digital images, the salient object segmentation system 106 can down-sample the higher-resolution digital images to the same predetermined (or a different) resolution.

As shown in FIG. 3C the salient object segmentation system 106 can also perform the act 324 of applying the convolutional neural network to the reduced-resolution digital image of the sub-region. In particular, the salient object segmentation system 106 can apply the convolutional neural network to the reduced-resolution digital image of the sub-region to identify pixels of the salient object portrayed within the reduced-resolution digital image of the sub-region. Based on the identified pixels, the salient object segmentation system 106 can generate a reduced-resolution segmentation map including a more detailed mapping of the pixels of the salient object with regard to the sub-region of the input digital image.

In one or more embodiments, the salient object segmentation system 106 refines one or more reduced-resolution segmentation maps based on subsequent iterations of applying the convolutional neural network to reduced-resolution digital images of regions and sub-regions of the input digital image. For example, because the reduced-resolution segmentation map generated in the act 324 includes a more detailed mapping of pixels around the dog's head than the reduced-resolution segmentation map including the entire dog, the salient object segmentation system 106 can generate an updated reduced-resolution segmentation map based on the reduced-resolution segmentation map for the region of the input image (from the act 314) as well as the reduced-resolution segmentation map for the sub-region of the input image (from the act 324).

In one or more embodiments, generating the updated reduced-resolution segmentation map includes updating or otherwise fine-tuning previously generated reduced-resolution segmentation maps. For example, the salient object segmentation system 106 can fine-tune pixel mappings based on subsequently generated reduced-resolution segmentation maps corresponding to more zoomed-in portions of the input digital image. Alternatively, in one or more embodiments, generating an updated reduced-resolution segmentation map includes generating an updated reduced-resolution segmentation map based on a combination of reduced-resolution segmentation maps corresponding to different regions of the input image. In addition, the salient object segmentation system 106 can prioritize pixels of the salient object identified within the more zoomed-in portions of the input digital image over less-zoomed in portions of the input digital image when generating the updated reduced-resolution segmentation map.

Similar to the act 316 discussed above, the salient object segmentation system 106 can also perform an act 326 of determining whether to perform additional refinement on the reduced-resolution segmentation map(s). For example, if the salient object segmentation system 106 determines that additional refinement should be performed, the salient object segmentation system 106 can identify an additional sub-region of the input digital image (e.g., repeat the acts 318-324). Alternatively, if the salient object segmentation system 106 determines to not perform additional refinement, the salient object segmentation system 106 can proceed to perform post-processing on the reduced-resolution segmentation map, as denoted by reference "C," and shown in further detail in connection with FIG. 3D.

As mentioned above, the salient object segmentation system 106 can determine whether to perform additional refinement in a number of ways. For example, in one or more embodiments, the salient object segmentation system 106 determines whether to perform additional refinement based on confidence values determined when applying the convolutional neural network to the reduced-resolution digital image of the identified region (or sub-region). For example, where applying the convolutional neural network to the reduced-resolution digital image of the sub-region results in a threshold number of pixels having low confidence values (e.g., confidence values below a confidence value threshold) the salient object segmentation system 106 can determine that additional refinement should be performed.

As another example, the object segmentation system 106 can determine whether to perform additional refinement based on a convergence of the confidence values. For example, where applying the convolutional neural network to the reduced-resolution digital of subsequently identified regions (or sub-regions) results in a difference in confidence values below a predetermined threshold, the object segmentation system 106 can determine that additional refinement should not be performed. Alternatively, where one or multiple confidence values differ by more than a predetermined threshold, the object segmentation system 106 can determine to perform additional refinement.

In addition, or as an alternative, the salient object segmentation system 106 may determine whether to perform additional refinement based on a convergence of pixels between iterations. For example, as will be described in further detail below, the salient object segmentation system 106 may compare a difference in pixel resolutions between identified regions (or sub-regions) of the input digital image to a threshold difference in pixel resolutions (e.g., a number of pixels or percentage of pixels) and determine whether additional refinement should be performed based on the comparison. To illustrate, where an initial portion of the input digital image (e.g., the original input digital image) has a resolution of 3000×2000 pixels, and the identified region has a resolution of 1000×1000 pixels, the salient object segmentation system may determine that a difference between the resolutions exceeds a threshold convergence value (e.g., a number or percentage of pixels) and determine that additional refinement should be performed. Alternatively, where a previously identified region has a resolution of 400×400 pixels and a subsequent region (or sub-region) has a resolution of 380×380, the salient object segmentation system 106 may determine that a difference in pixel resolution between the identified regions is less than a threshold convergence value and determine that additional refinement should not be performed.

As a further example, the salient object segmentation system 106 may determine whether to perform additional refinement based on a threshold number of iterations (e.g., a number of iterations of applying the convolutional neural network to reduced-resolution digital images corresponding to respective regions of the input digital image). For example, the salient object segmentation system 106 may apply the convolutional neural network a threshold or pre-determined number of times (e.g., five iterations) to reduced-resolution digital images corresponding to identified regions or sub-regions of the input digital image prior to performing post-processing on a resulting segmentation map.

In one or more embodiments, the salient object segmentation system 106 determines whether to perform additional refinement based on a threshold duration of time. For example, the salient object segmentation system 106 may apply the convolutional neural network to any number of reduced-resolution digital images corresponding to regions or sub-regions of the input digital image until a threshold duration of time has passed (e.g., five seconds), and then proceed to performing post-processing on a resulting segmentation map.

As discussed above, in one or more embodiments, the salient object segmentation system 106 also applies post-processing techniques to one or more reduced-resolution segmentation maps. For example, FIG. 3D illustrates the salient object segmentation system 106 performing an act 328 of post-processing the reduced-resolution segmentation map(s) to generate a segmentation map that accurately identifies pixels of the salient object within the input digital image. In particular, the salient object segmentation system 106 can perform post-processing on the reduced-resolution segmentation map(s) to generate a segmentation map having a resolution corresponding to a resolution of the input digital image. For instance, where the input digital image has a 3000×2000 resolution, the salient object segmentation system 106 can generate a segmentation map of the input digital image having a resolution of 3000×2000 (e.g. a 1:1 pixel ratio between resolutions of the segmentation map and the input digital image).

As discussed above in connection with FIG. 2, the salient object segmentation system 106 can perform the act 328 of post-processing on the reduced-resolution segmentation image to generate a segmentation map of the input image based on both the reduced-resolution segmentation map and the input digital image. For example, as shown in FIG. 3D, the salient object segmentation system 106 can perform an act 332 of applying a filter when up-sampling the reduced-resolution segmentation map in view of the input digital image to generate the segmentation map having a similar resolution as the input digital image.

While up-sampling the reduced-resolution segmentation map(s), the salient object segmentation system 106 can apply one or more of a variety of filters. For example, in one or more embodiments, the object segmentation system 106 utilizes a dense CRF filter that applies pattern recognition and machine learning for predicting whether a pixel from an up-sampled image will correspond to an identified pixel of a salient object (or identified non-pixel) from a reduced-resolution digital image. As mentioned above, in applying the dense CRF filter, the object segmentation system 106 considers pixels of one or more reduced-resolution segmentation maps in combination with the input digital image.

As another example, the object segmentation system 106 can utilize a guided filter when up-sampling the reduced-resolution segmentation map to generate a segmentation map having a resolution of the input digital image. For instance, the guided filter can generate a filtered segmentation map based on the reduced resolution segmentation map and the input image by performing an edge-preserving smoothing operator while considering content of a guidance image (e.g., the input digital image). As a further example, the object segmentation system 106 can utilize a graph cut filter that refines pixel identification by applying a standard minimum cut algorithm that minimizes an energy function near detected edges of the salient object, thereby reducing noise in the up-sampled segmentation map.

As shown in FIG. 3D, in applying the filter to the reduced-resolution segmentation map, the salient object segmentation system 106 can perform a number of operations on pixels while generating the segmentation map for the input digital image. For example, in one or more embodiments, the salient object segmentation system 106 performs an act 334 of refining pixel labels for any pixel of the input image predicted to correspond to the salient object. For example, as the salient object segmentation system 106 up-samples and/or combines mappings of pixels from the reduced resolution segmentation map(s) while generating a final segmentation map, the salient object segmentation system 106 can refine labels or otherwise change classifications of pixels as part of (or not part of) the salient object.

In addition, the salient object segmentation system 106 can perform an act 336 of generating a border mask including a mapping of pixels around a border of the salient object. For example, in one or more embodiments, the salient object segmentation system 106 identifies an inner/outer boundary having a similar shape as any inner/outer edges of the segmentation map to accurately identify pixels that border the salient object.

As further shown in FIG. 3D, the salient object segmentation system 106 can additionally perform an act 338 of refining edge pixels based on detected edges of the salient object within the boundary of the border mask. For example, the salient object segmentation system 106 can fine-tune identification of pixels of the salient object based on detected edges of the salient within the generated boundary around the salient object.

Upon generating the segmentation map based on the post-processing, the salient object segmentation system 106 can perform an act 330 of generating a modified digital image based on the identified pixels of the salient object portrayed within the input image. For example, the salient object segmentation system 106 can modify the input digital image by designating the identified pixels as foreground pixels or otherwise grouping the pixels such that a user of a client device 108 can interact with the pixels of the salient object to perform a variety of editing functions. For example, the user can modify a background of a digital image (e.g., fade or obscure the background) without modifying the identified pixels of the salient object. Moreover, the salient object segmentation system 106 can modify the appearance (e.g., color, hue, contrast, or brightness), size, orientation, or alignment of the salient object. As another example, the user can select the salient object to superimpose the salient object on another digital image. Indeed, it will be understood that the user of the client device 108 can perform any number of interactions or modifications to the digital image based on features and functionality provided by the image editing application 110 and/or image modification system 104.

As illustrated by the foregoing example embodiments, the salient object segmentation system 106 can generate a segmentation map of a salient object by iteratively applying a convolutional neural network to reduced-resolution digital images. Accordingly, the foregoing acts and algorithms described in relation to FIGS. 2-3D can comprise a corresponding structure for a step for generating a segmentation map of a salient object by iteratively applying a convolutional neural network to a plurality of reduced-resolution digital images from an input digital image. For example, in one or more embodiments, the acts 206 and 216 can comprise a structure for a step for generating a segmentation map of a salient object by iteratively applying a convolutional neural network to a plurality of reduced-resolution digital images from an input digital image. As another example, in one or more embodiments, acts 306-328 comprise a structure for a step for generating a segmentation map of a salient object by iteratively applying a convolutional neural network to a plurality of reduced-resolution digital images from an input digital image.

While one or more embodiments described herein refer to identifying pixels of a salient object within an input digital image, the salient object segmentation system 106 can apply a similar process to identify pixels of multiple objects portrayed within an input digital image. For instance, FIG. 4 illustrates an example embodiment in which two salient objects are detected within a single input digital image and pixels of the respective objects are determined in accordance with one or more embodiments described above.

Figure 4:
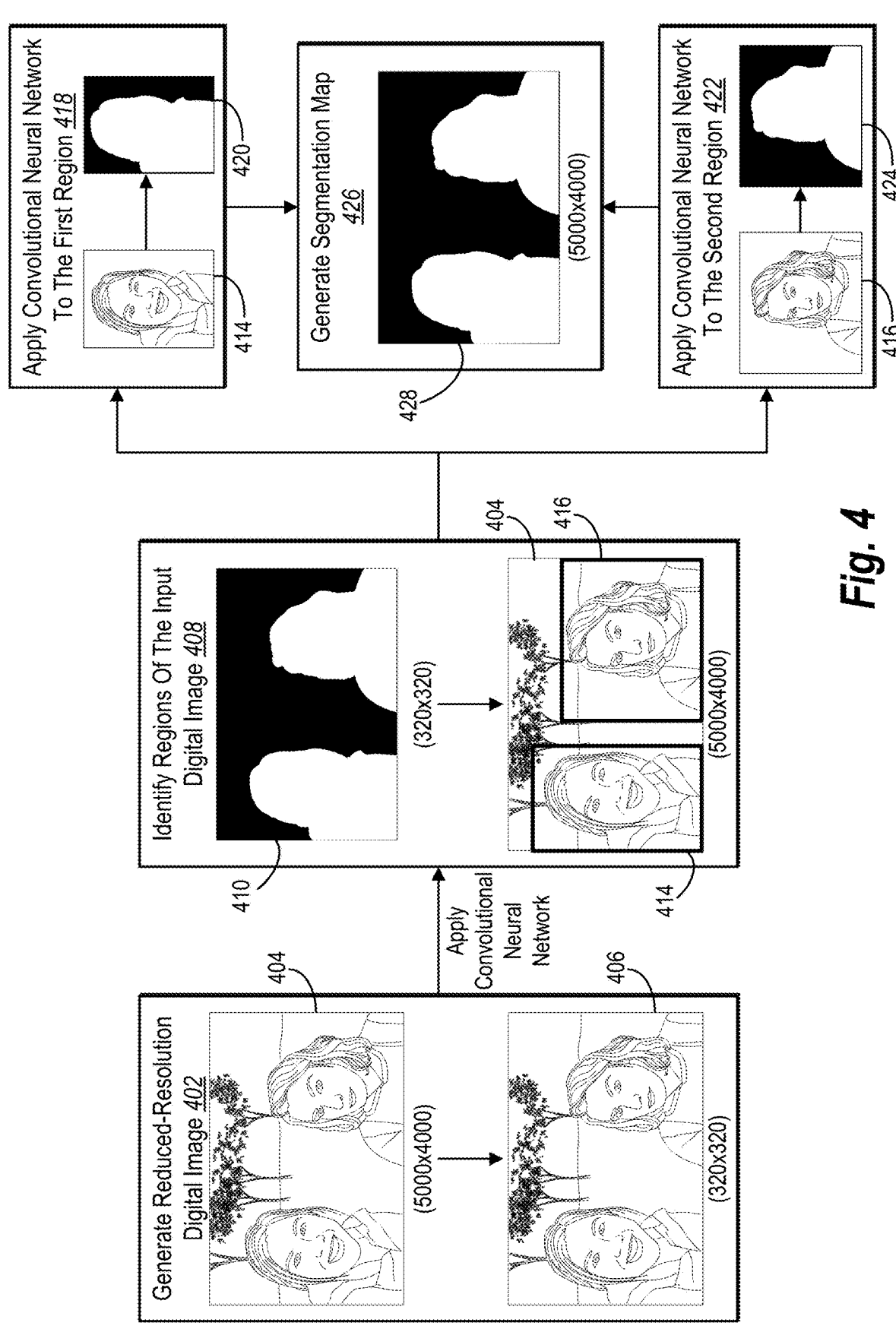
FIG. 4 illustrates an example process for identifying pixels of multiple salient objects within a digital image in accordance with one or more embodiments.

For example, as shown in FIG. 4, the salient object segmentation system 106 identifies an input digital image 404 and performs an act 402 of generating a reduced-resolution digital image 406 based on the input digital image 404. In particular, as shown in FIG. 4, the salient object segmentation system 106 down-samples the input digital image 404 having a resolution of 5000×4000 pixels (e.g., 20 megapixels) to generate the reduced-resolution digital image 406 having a resolution of 320×320 pixels.

As shown in FIG. 4, the salient object segmentation system 106 applies a convolutional neural network to the reduced-resolution digital image to identify pixels of the reduced-resolution digital image that correspond to salient objects (e.g., two individuals) portrayed within the input digital image. For example, the salient object segmentation system 106 can apply the convolutional neural network to determine confidence scores that pixels of the reduced-resolution digital image correspond to the salient objects.

As further shown in FIG. 4, the salient object segmentation system 106 performs the act 408 of identifying regions of the input digital image corresponding to the multiple salient objects. For instance, by applying the convolutional neural network to the reduced-resolution digital image 406, the salient object segmentation system 106 generates a reduced-resolution segmentation map 410 (e.g., an initial segmentation map) having a 320×320 resolution.

In addition, the salient object segmentation system 106 analyzes the reduced-resolution segmentation map 410 to identify a first region 414 corresponding to a first salient object and a second region 416 corresponding to a second salient object. The salient object segmentation system 106 can identify the regions 414, 416 in a variety of ways. For example, the salient object segmentation system 106 can analyze the reduced-resolution segmentation map 410 to identify two non-continuous groups of white pixels. Based on the reduced-resolution segmentation map 410 including discrete non-continuous groupings of white pixels, the salient object segmentation system 106 can determine that the input digital image 402 includes two salient objects. The salient object segmentation system 106 can then identify regions (e.g., bounding boxes or borders) corresponding to each of the two salient objects.

As another example, the salient object segmentation system 106 can identify the regions 414, 416 by first identifying a single region of the reduced-resolution segmentation map that includes all of the pixels identified as corresponding to the salient object(s) (e.g., white pixels). The salient object segmentation system 106 can further determine that a significant portion of the single region (e.g., a threshold portion of the region) includes pixels that have not been identified as pixels of salient objects (e.g., black pixels). Based on the determination that significant portion of the region includes pixels not identified as pixels of salient objects, the salient object segmentation system 106 may determine to divide the single region into multiple regions and analyze the regions separately.

Similarly, the salient object segmentation system 106 can identify the regions 414, 416 based on a size of the identified salient object(s). For example, the salient object segmentation system 106 can generate a bounding box (or border) that encompasses the identified salient object(s). If the bounding box exceeds a threshold (e.g., a threshold number of pixels or a threshold percentage of the input digital image), the salient object segmentation system 106 can divide the bounding box into multiple regions to analyze the digital image.

While the example shown in FIG. 4 illustrates two salient objects that do not overlap, the salient object segmentation system 106 may nonetheless identify regions corresponding to multiple salient objects that partially overlap. Indeed, the salient object segmentation system 106 may determine to identify discrete regions based on groupings of high or low confidence values, irregular shapes of groupings of white pixels, concentrations of white pixels connected by less concentrated groupings of white pixels, or other characteristics of pixels identified as corresponding to (or not corresponding to) salient objects. In addition, in one or more embodiments, the salient object segmentation system 106 may determine to identify discrete regions of an input image after performing multiple iterations of applying the convolutional neural network to reduced-resolution digital images based on zoomed-in portions of the input digital image.

As further shown in FIG. 4, the salient object segmentation system 106 can apply the convolutional network to different regions 414, 416 of the input digital image. For example, the salient object segmentation system 106 can down-sample the first identified region 414 of the input digital image 404 to generate a reduced-resolution digital image of the first region and perform an act 418 of applying the convolutional neural network to generate a reduced-resolution segmentation map 420 for the first region. In addition, the salient object segmentation system 106 can down-sample the second identified region 416 of the input digital image 404 to generate a reduced-resolution digital image of the second region and perform the act 422 of applying the convolutional neural network to generate a reduced-resolution segmentation map 424 for the second region. Similar to one or more embodiments described above, the salient object segmentation system 106 can iteratively apply the convolutional neural network to the respective regions 414, 416 of the input digital image 404 any number of times to further refine or otherwise generate updated reduced-resolution segmentation maps corresponding to the respective regions 414, 416 of the input digital image 404.

As shown in FIG. 4, the salient object segmentation map 106 can also perform an act 426 of generating a segmentation map 428. In particular, the salient object segmentation system 106 can combine identified pixels of the reduced-resolution segmentation maps 420, 424 to generate the segmentation map 428 for the input digital image. Specifically, the salient object segmentation system 106 can combine the reduced-resolution segmentation maps 420, 424 and further perform post-processing on the segmentation maps 420, 424 to generate a segmentation map 428 having a resolution (e.g., 5000×4000 pixels) corresponding to the resolution of the input digital image 404.

In one or more embodiments, the salient object segmentation system 106 generates a combined reduced-resolution segmentation map based on the reduced-resolution segmentation maps 420, 424 for the regions 414, 416 and performs post-processing on the combined reduced-resolution segmentation map. Alternatively, the salient object segmentation system 106 can perform post-processing on the individual reduced-resolution segmentation maps 420, 424 and then generate a combined segmentation based on up-sampled segmentation maps for the respective regions 414, 416.

In some circumstances, a salient object may take up a large portion of a digital image. The salient object segmentation system can further reduce processing power and time by identifying and analyzing regions corresponding to a boundary of the salient object (i.e., rather than internal portions of the salient object that make up a large portion of the digital image). For example, FIG. 5 illustrates an additional example in which the salient object segmentation system 106 identifies pixels of a salient object portrayed within an input digital image (e.g., a salient object that takes up a large portion of the digital image).

Figure 5:
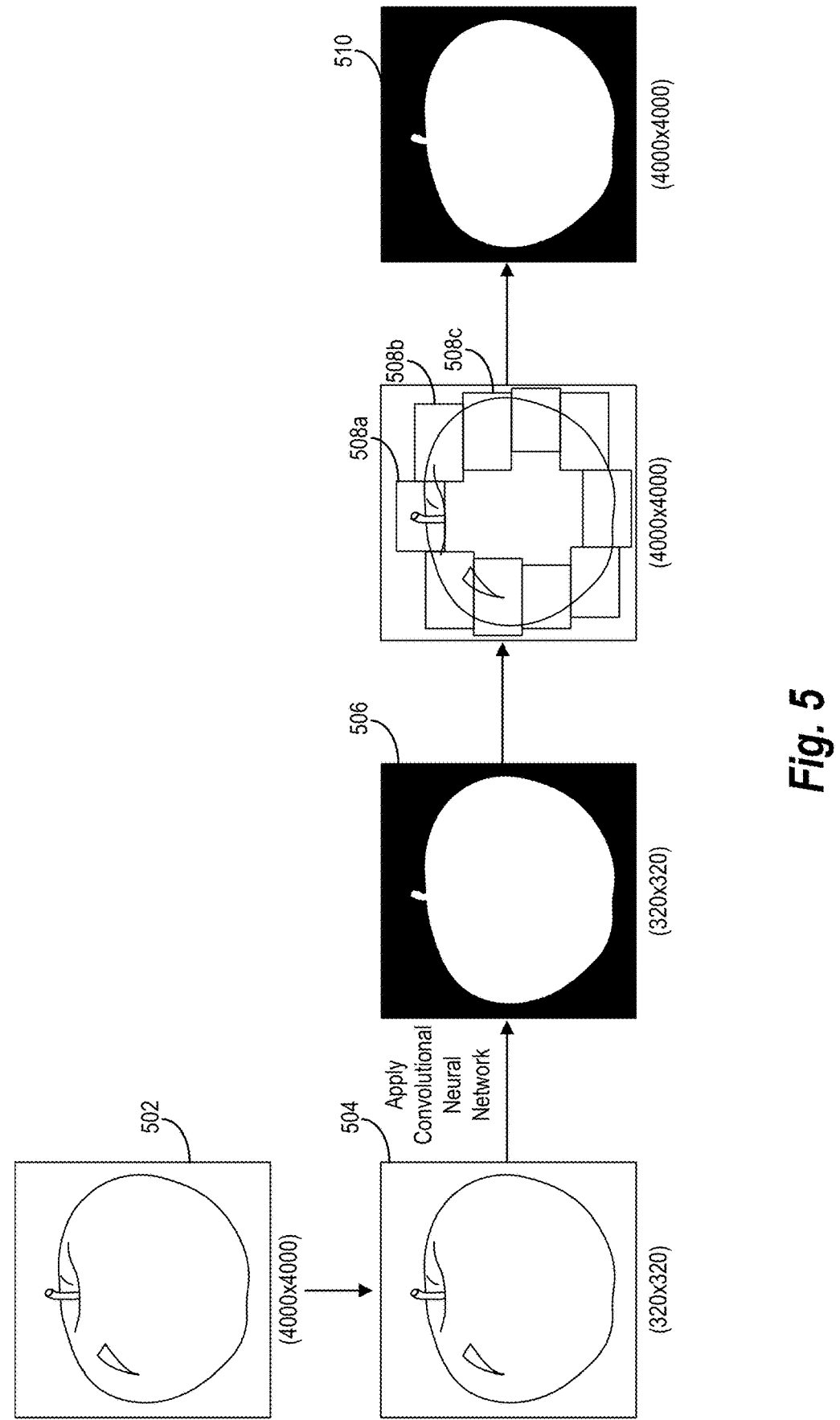
FIG. 5 illustrates an example process for identifying pixels around edges of a salient object within a digital image in accordance with one or more embodiments.

In particular, in relation to FIG. 5 the salient object segmentation system 106 receives an input digital image 502 (having a resolution of 4000×4000 pixels) and that portrays an apple. As described in greater detail above, the salient object segmentation system 106 generates a reduced-resolution digital image 504 (having a resolution of 320×320 pixels) and applies a convolutional neural network to the reduced-resolution digital image to generate a reduced-resolution segmentation map 506 (having a resolution of 320×320 pixels).

In identifying a region of the input image 502 corresponding to the salient object, the salient object segmentation system 106 determines that the salient object (or a region that encompasses the salient object) subsumes or covers almost the entire input digital image 502 (e.g., more than a threshold percentage of the input digital image 502). In particular, the salient object segmentation system 106 compares a size of the salient object (or a size of a region of the salient object such as a bounding box) with a size of the digital image and determines that the size of the salient object satisfies a size threshold. Based on this determination, the salient object segmentation system 106 may analyze the reduced-resolution segmentation map 506 to identify edges of the salient object.

Moreover, as shown in FIG. 5, the salient object segmentation system 106 can identify a number of regions (e.g., regions 508*a-c*) spaced around the detected edges of the salient object. In one or more embodiments, the salient object segmentation system 106 identifies regions having predetermined dimensions (e.g., 1000×1000 pixel regions) spaced around the salient object until the entire boundary (or all of the detected edges) around the salient object is included within at least one of the identified regions. While the example shown in FIG. 5 includes non-overlapping regions, in one or more embodiments, the salient object segmentation system 106 identifies regions that partially overlap (e.g., overlap by a threshold amount) until the entire boundary around the salient object is included within the identified regions.

Moreover, in relation to FIG. 5, the salient object segmentation system 106 generates reduced-resolution digital images for the identified regions and iteratively apply the convolutional neural network to the identified regions. Further, in one or more embodiments, the salient object segmentation system 106 performs additional refinement as described above (e.g., as described in FIG. 3C).

In relation to FIG. 5, the salient object segmentation system 106 also combines reduced-resolution segmentation maps generated for the identified regions around the boundary of the salient object. In this manner, the salient object segmentation system 106 generate the segmentation map 510 of the input digital image 502. For example, as shown in FIG. 5, the salient object segmentation system 106 can generate the segmentation map 510 having a resolution (e.g., 4000×4000 pixels) corresponding to the resolution of the input digital image 502.

Figure 6:
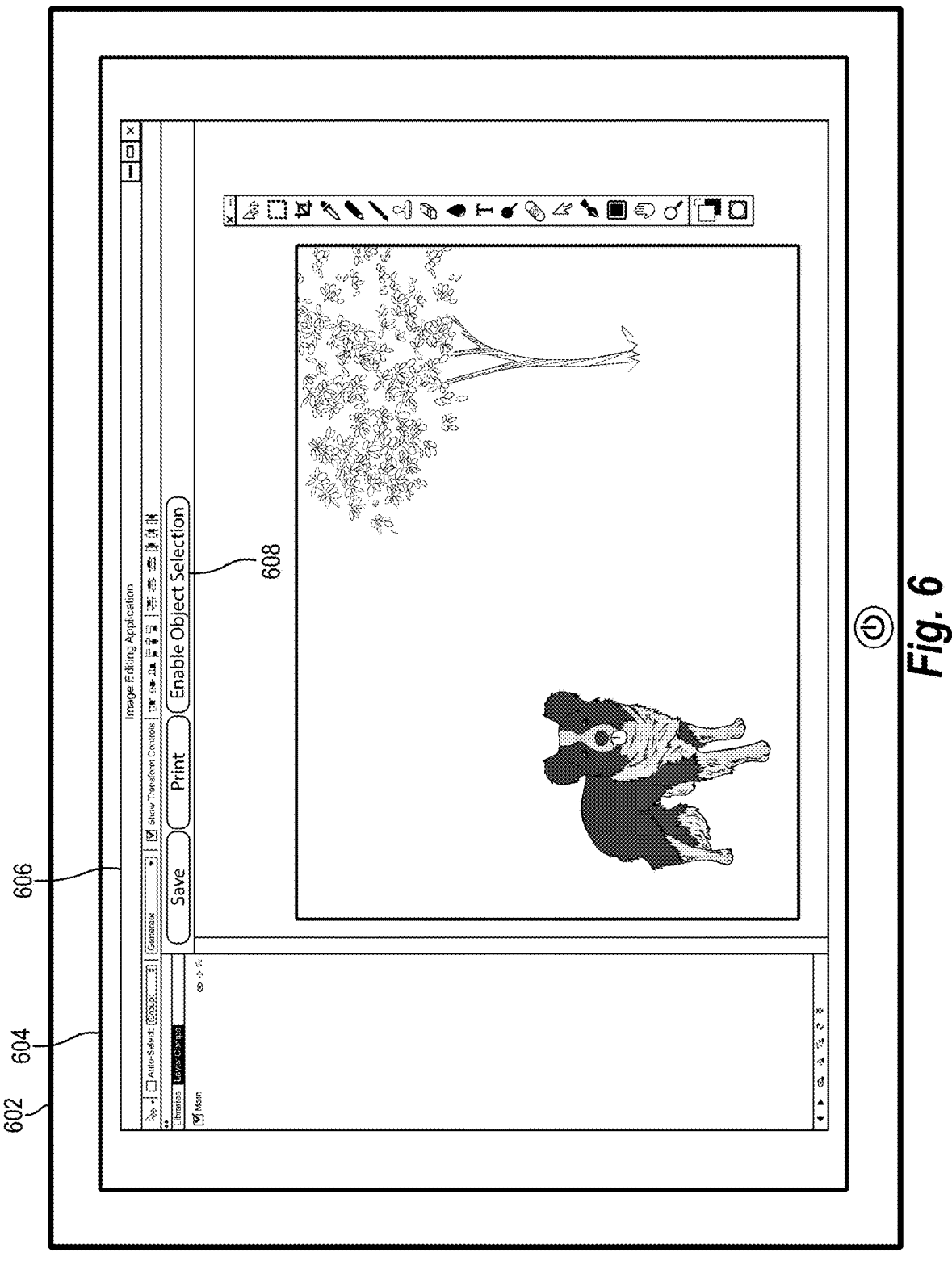
FIG. 6 illustrates an example user interface in which pixels of a salient object within a digital image are identified in accordance with one or more embodiments

As mentioned above, the salient object segmentation system 106 can facilitate identification of pixels without requiring that a user manually indicate portions of a digital image corresponding to objects portrayed therein. For instance, FIG. 6 illustrates an example client device 602 including a graphical user interface 604 of an image editing application 110. As shown in FIG. 6, the graphical user interface 604 includes a display of a digital image 606 including an object portrayed therein.

As further shown, the graphical user interface 604 includes various selectable options including an "enable object selection" button 608. In response to detecting a selection of the enable object selection button 608, the salient object segmentation system 106 can identify pixels of the displayed digital image corresponding to the object portrayed therein in accordance with one or more embodiments described herein. For example, the salient object segmentation system 106 can generate a reduced-resolution digital image, iteratively apply a convolutional neural network to various regions and sub-regions of the digital image 606, generate and refine one or more reduced-resolution segmentation maps, and perform post-processing on the reduced-resolution segmentation map(s) to accurately identify pixels of the digital image 606 that correspond to the object based on the segmentation map. The salient object segmentation system 106 can further modify the displayed image 606 based on the identified pixels corresponding to the object.

In one or more embodiments, the salient object segmentation system 106 performs the process of identifying pixels of the salient object and modifying the displayed image 606 on the client device 602. For example, as mentioned above, the salient object segmentation system 106 can be implemented wholly (or in part) on the client device 602. Alternatively, in one or more embodiments, in response to detecting the selection of the enable object selection button 608, a salient object segmentation system 106 on a server device remotely performs the process of identifying pixels of the salient object and modifying the displayed image.

Figure 7:
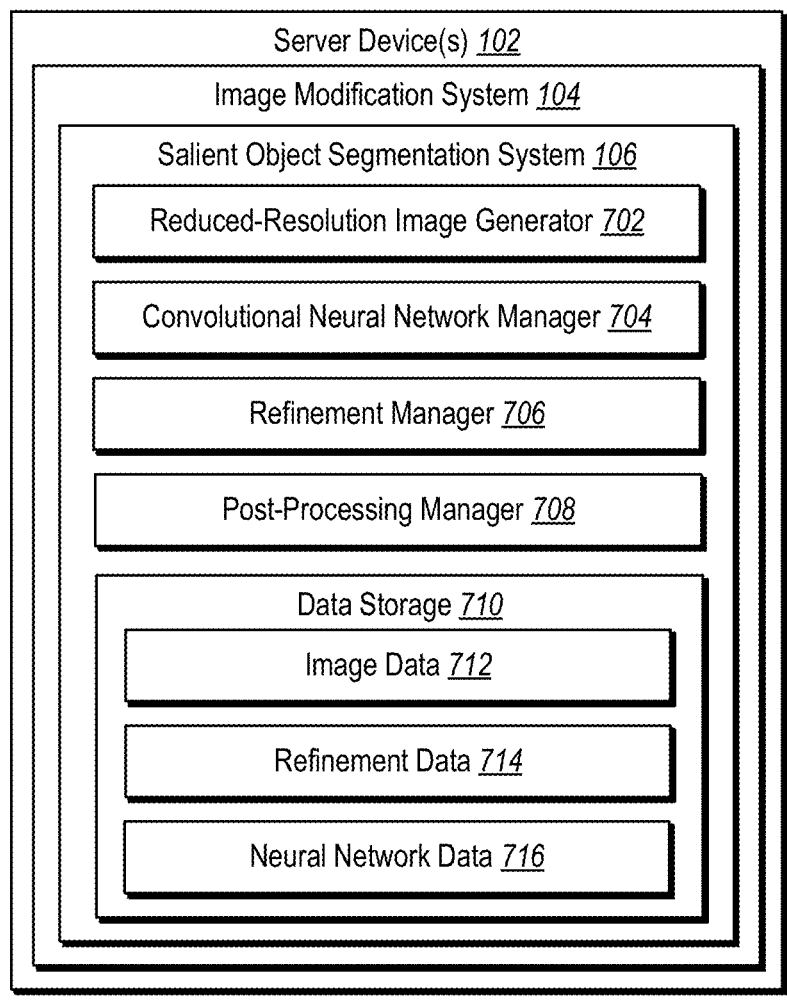
FIG. 7 illustrates a schematic diagram of an example salient object segmentation system in accordance with one or more embodiments.

Turning now to FIG. 7 additional detail will be provided regarding components and capabilities of an example architecture for the salient object segmentation system 106. As mentioned above, the salient object segmentation system 106 may be implemented by a variety of computing devices including the server device(s) 102, the client device 108, 602, or a combination of the two. As shown in FIG. 7, the salient object segmentation system 106 includes a reduced-resolution image generator 702, a convolutional neural network manager 704, a refinement manager 706, and a post-processing manager 708. In addition, the salient object segmentation system 106 includes a data storage 710 including image data 712, refinement data 714, and neural network data 716.

In one or more embodiments, each of the components of the salient object segmentation system 106 are in communication with one another using any suitable communication technologies. Additionally, the components of the salient object segmentation system 106 can be in communication with one or more other devices including the client device 108, as illustrated in FIG. 1. It will be recognized that although the components of the salient object segmentation system 106 are shown to be separate in FIG. 7, any of the sub-components may be combined into fewer components, such as into a single component, or divided into more components as may serve a particular implementation. Furthermore, although the components of FIG. 7 are described in connection with the salient object segmentation system 106, at least some of the components for performing operations in conjunction with the salient object segmentation system 106 may be implemented on other devices within the environment.

The components of the salient object segmentation system 106 can include software, hardware, or both. For example, the components of the salient object segmentation system 106 can include one or more instructions stored on a computer-readable storage medium and executable by processors of one or more computing devices (e.g., the server device(s)). When executed by the one or more processors, the computer-executable instructions of the salient object segmentation system 106 can cause the server device(s) 102 to perform the methods described herein. Alternatively, the components of the salient object segmentation system 106 can comprise hardware, such as a special purpose processing device to perform a certain function or group of functions. Additionally or alternatively, the components of the salient object segmentation system 106 can include a combination of computer-executable instructions and hardware.

Furthermore, the components of the salient object segmentation system 106 performing the functions described herein with respect to the salient object segmentation system 106 may, for example, be implemented as part of a stand-alone application, as a module of an application, as a plug-in for applications including content management applications, as a library function or functions that may be called by other applications, and/or as a cloud-computing model. Thus, the components of the salient object segmentation system 106 may be implemented as part of a stand-alone application on a personal computing device or a mobile device. Alternatively or additionally, the components of the salient object segmentation system 106 may be implemented in any application that allows product and customer management, including, but not limited to, applications in ADOBE PHOTOSHOP, ADOBE LIGHTROOM, or ADOBE PREMIERE. "ADOBE," "PHOTSHOP," "LIGHTROOM," and "PREMIERE" are either registered trademarks or trademarks of Adobe Systems Incorporated in the United States and/or other countries.

As shown in FIG. 7, the salient object segmentation system 106 includes a reduced-resolution image generator 702. In one or more embodiments, the reduced-resolution image generator 702 down-samples or otherwise modifies one or more digital images to generate a digital image having a reduced-resolution from the original digital image. For example, the reduced-resolution image generator 702 can modify an input digital image to generate a reduced-resolution digital image based on the input digital image (but having a lower pixel resolution). In addition, the reduced-resolution image generator 702 can similarly modify identified regions or sub-regions of the input digital image to generate reduced-resolution digital images corresponding to the identified regions or sub-regions and having lower pixel resolutions than the identified portions of the input digital image.

As further shown in FIG. 7, the salient object segmentation system 106 includes a convolutional neural network manager 704. The convolutional neural network manager 704 can apply a convolutional neural network trained to analyze a reduced-resolution digital image and identify pixels from the reduced-resolution digital image predicted to correspond to a salient object portrayed therein. In one or more embodiments, the convolutional neural network manager 704 applies a convolutional neural network that analyzes the reduced-resolution digital image and determines confidence scores for the pixels of the reduced-resolution digital image associated with whether a given pixel is part of a salient object.

As mentioned above, the convolutional neural network manager 704 can iteratively apply the convolutional neural network to any number of reduced-resolution digital images to identify pixels of a salient object and further generate reduced-resolution segmentation maps corresponding to each iteration. For example, in conjunction with applying the convolutional neural network to each reduced-resolution digital image, the convolutional neural network manager 704 can generate a corresponding reduced-resolution segmentation map that indicates pixels of the salient object.

As further shown in FIG. 7, the salient object segmentation system 106 includes a refinement manager 706. In one or more embodiments, the refinement manager 706 determines whether to perform additional refinement on generated reduced-resolution segmentation maps. For example, the refinement manager 706 may determine to perform one or more additional iterations of identifying a region or sub-region of an input digital image and apply the convolutional neural network to reduced-resolution digital images of the region or sub-region. As discussed above, the refinement manager 706 can determine whether to perform additional refinement in a variety of ways.

In addition, the refinement manager 706 can further direct performance of additional refinement in generating a segmentation map that indicates pixels of the salient object. For example, the refinement manager 706 may identify a region or sub-region of the input image where a reduced-resolution segmentation map needs additional refinement. For instance, the refinement manager 706 can analyze a reduced-resolution segmentation map to identify a sub-region where the pixel identification is unclear or inconsistent and identify a corresponding sub-region of the input digital image for further applications of the convolutional neural network.

As further shown in FIG. 7, the salient object segmentation system 106 includes a post-processing manager 708. The post-processing manager 708 can apply one or more filters to the reduced-resolution segmentation map(s) in view of the input digital image to generate a segmentation map for the input digital image having a resolution corresponding to the resolution of the input digital image. For example, in one or more embodiments, the post-processing manager 708 generates an up-sampled segmentation map including an identification of pixels within the input digital image that correspond to the salient object portrayed therein.

As illustrated in FIG. 7, the salient object segmentation system 106 includes a data storage 710 including image data 712. The image data 712 can include any information associated with an input digital image including pixel data, file data, or other information about a digital image. As an example, the image data 712 can include any data that the salient object segmentation system 106 utilizes to generate a reduced-resolution digital image based on the input digital image. In addition, the image data 712 can include any data that the salient object segmentation system 106 utilizes when performing post-processing to generate a segmentation map that identifies pixels of a salient object portrayed within the input digital image.

In addition to the image data 712, the data storage 710 can include refinement data 714. The refinement data 714 can include any data that the salient object segmentation system 106 uses to determine whether to perform another iteration that involves applying the convolutional neural network to a reduced-resolution digital image of a region or sub-region of the input digital image. For example, the refinement data 714 can include confidence values, convergence values, and threshold values (e.g., confidence threshold, convergence threshold, time duration threshold, number of iterations threshold) that the salient object segmentation system 106 utilizes in determining whether to refine one or more reduced-resolution segmentation maps in accordance with one or more embodiments described herein.

The data storage 710 can further include neural network data 716. The neural network data 716 can include trained models, parameters (e.g., trained weights), neural network architecture, and/or any data that the salient object segmentation system 106 can utilize when applying a convolutional neural network to a reduced-resolution digital image. In one or more embodiments, the neural network data 716 includes an identification of a resolution for which the convolutional neural network has been trained to analyze. For example, the reduced-resolution image generator 702 can utilize the neural network data 716 to determine a resolution when generating a reduced-resolution digital image.

Turning now to FIG. 8, this figure illustrates a flowchart including a series of acts 800 of autonomously segmenting salient objects portrayed in digital images (e.g., high resolution digital images). While FIG. 8 illustrates acts according to one or more embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

For example, the series of acts 800 can include an act 810 of generating a reduced-resolution digital image from an input digital image. For example, in one or more embodiments, the act 810 includes generating a reduced-resolution digital image from an input digital image having an image resolution. In one or more embodiments, the series of acts includes generating the reduced-resolution digital image of the input digital image by down-sampling the input digital image to a resolution. As further shown in FIG. 8, the series of acts 800 can include an act 820 of applying a neural network to the reduced-resolution digital image to identify a region of the input digital image corresponding to a salient object. For example, in one or more embodiments, the act 820 includes applying a neural network to the reduced-resolution digital image to identify a region of the input digital image corresponding to a salient object portrayed within the input digital image.

As further shown in FIG. 8, the series of acts 800 can include an act 830 of generating a reduced-resolution digital image of the region of the input digital image. For example, in one or more embodiments, the act 830 includes, based on the identified region and the input digital image, generating a reduced-resolution digital image of the region. In one or more embodiments, the series of acts 800 includes generating the reduced-resolution digital image of the region of the input digital image by down-sampling the identified region of the input digital image to a resolution corresponding to the resolution of the reduced-resolution digital image of the input image. In one or more embodiments, a resolution of the reduced-resolution digital image corresponds to a resolution of the reduced-resolution segmentation map of the salient object. In addition, in one or more embodiments, a resolution of the reduced-resolution digital image corresponds to a resolution of the reduced-resolution digital image of the region.

As further shown in FIG. 8, the series of acts 800 can include an act 840 of applying the neural network to the reduced-resolution digital image of the region to generate a reduced-resolution segmentation map. For example, in one or more embodiments, the act 840 includes applying the neural network to the reduced-resolution digital image of the region to generate a reduced-resolution segmentation map of the salient object. As further shown in FIG. 8, the series of acts 800 can include an act 850 of generating a segmentation map for selecting the salient object in the digital image. For example, in one or more embodiments, the act 850 includes, based on the reduced-resolution segmentation map and the input digital image, generating a segmentation map for selecting the salient object in the digital image, wherein the segmentation map has a resolution corresponding to the image resolution of the input digital image. In one or more embodiments, the series of acts includes selecting pixels of the input digital image portraying the salient object based on the segmentation map.

In one or more embodiments, the series of acts 800 includes utilizing the neural network to generate an initial segmentation map for the reduced-resolution digital image, wherein the initial segmentation map comprises a mapping of pixels within the reduced-resolution digital image that correspond to the salient object. In addition, in one or more embodiments, the series of acts 800 includes identifying the region of the input digital image corresponding to the salient object based on the mapping of pixels from the initial segmentation map.

In one or more embodiments, the series of acts 800 includes analyzing the reduced-resolution segmentation map of the salient object to identify a sub-region of the input digital image within the identified region of the input digital image, wherein the sub-region corresponds to a portion of the salient object portrayed within the input digital image. In one or more embodiments, the series of acts 800 further includes, based on the identified sub-region of the input digital image, generating a reduced-resolution digital image of the sub-region. In addition, in one or more embodiments, the series of acts 800 includes applying the neural network to the reduced-resolution digital image of the sub-region to generate an additional reduced-resolution segmentation map of the portion of the salient object corresponding to the sub-region of the input digital image.

In one or more embodiments, the reduced-resolution segmentation map of the salient object includes confidence values corresponding to pixels within the region of the input digital image. In one or more embodiments, the series of acts 800 incudes identifying the region based on the confidence values. In addition, in one or more embodiments, the series of acts 800 includes identifying the sub-region by determining that one or more confidence values corresponding to one or more pixels in the sub-region do not satisfy a threshold confidence value.

In one or more embodiments, the series of acts 800 includes generating the reduced-resolution segmentation map of the salient object by iteratively applying the neural network to one or more additional reduced-resolution digital images within the region until satisfying a threshold condition. For example, in one or more embodiments, the threshold condition includes one or more of a predefined number of iterations of applying the neural network, a predefined duration of time, or threshold convergence of pixels between consecutive iterations.

In one or more embodiments, the series of acts 800 includes identifying an additional region of the input digital image corresponding to an additional salient object portrayed within the input digital image. The series of acts 800 can further include applying the neural network to an additional reduced-resolution digital image of the additional region to generate an additional reduced-resolution segmentation map of the additional salient object. In addition, the series of acts 800 can include generating the segmentation map based on the additional reduced-resolution segmentation map.

Furthermore, in one or more embodiments, the series of acts 800 includes generating the segmentation map of the salient object having the resolution corresponding to the image resolution of the input digital image by applying at least one of a dense conditional random field (CRF) filter, a guided filter, or a graph cut filter to the reduced-resolution segmentation map of the salient object in view of the input digital image to identify pixels of the input digital image corresponding to the salient object. In one or more embodiments, the series of acts includes generating the segmentation map of the salient object having a map resolution corresponding to an image resolution of the input digital image by refining pixel labels of the segmentation map to identify pixels of the segmentation map corresponding to the salient object, generating a border mask that identifies pixels around a border of the salient object, and refining pixel labels around detected edges within the border of the salient object.

Furthermore, in one or more embodiments, the series of acts 800 includes utilizing the segmentation map to select pixels of the input digital image portraying the salient object. In addition, in one or more embodiments, the series of acts 800 includes generating a modified digital image by modifying the selected pixels of the input digital image portraying the salient object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
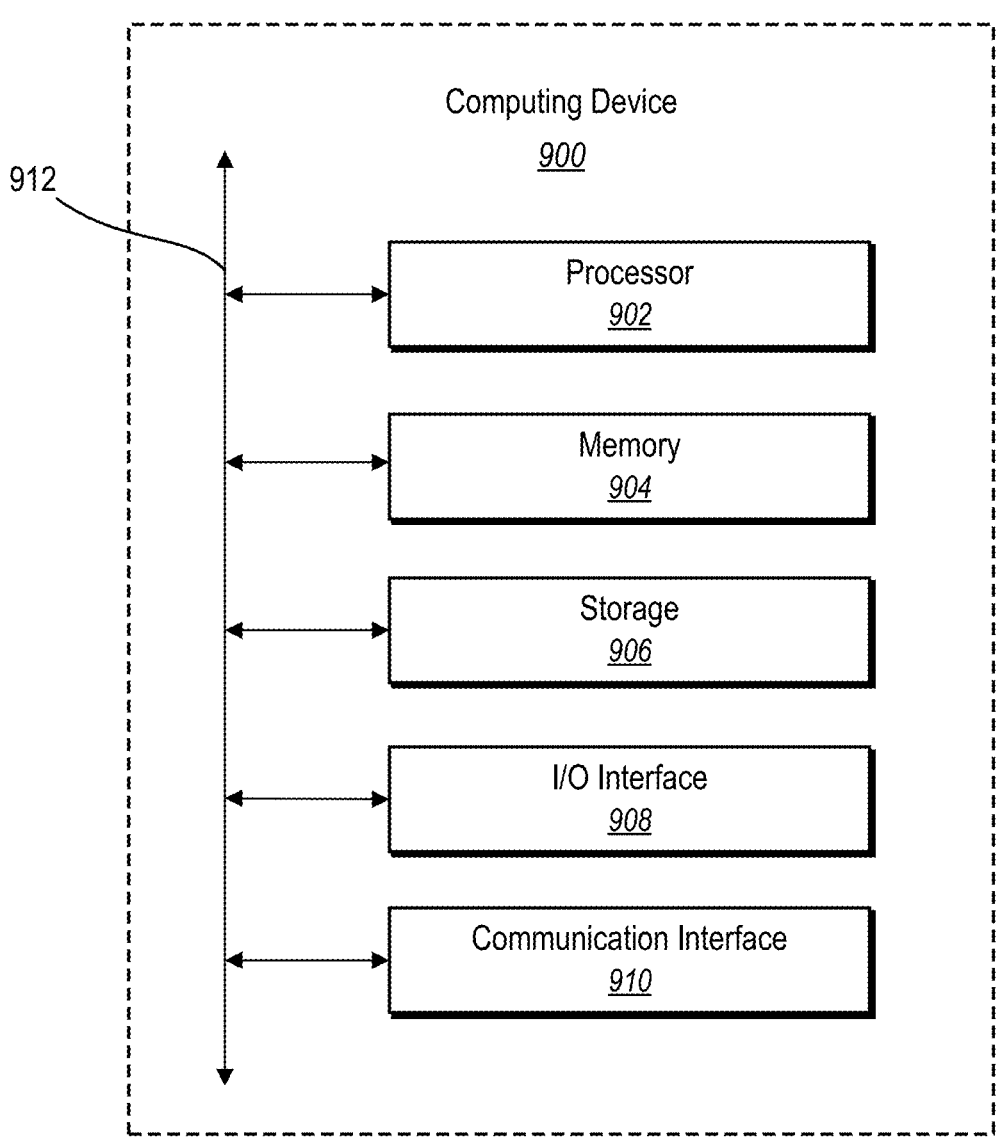
FIG. 9 illustrates a block diagram of an example computing device in accordance with one or more embodiments.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
   one or more memory devices comprising a neural network; and
   at least one processor configured to cause the system to:
      determine a region of a digital image having a first resolution and comprising a single salient object;
      generate, from the region of the digital image comprising the single salient object, a segmentation map of the single salient object having a second resolution corresponding to a predetermined image resolution specification of the neural network by utilizing the neural network to identify pixels of the digital image corresponding to the single salient object in the region of the digital image;
      determine whether to perform additional refinement to the segmentation map of the region of the digital image comprising the single salient object;
      generate, from a sub-region of the region of the digital image and based on determining to perform additional refinement to the segmentation map, an additional segmentation map of the sub-region of the region having the second resolution by utilizing the neural network to refine identification of the pixels corresponding to the single salient object in the sub-region; and
      generate, from the digital image, the segmentation map of the region of the digital image, and the additional segmentation map of the sub-region, a refined segmentation map of the digital image having the first resolution that identifies the pixels in the digital image corresponding to the single salient object.

2. The system of claim 1, wherein the at least one processor is further configured cause the system to generate the refined segmentation map of the digital image without user input indicating a portion of the digital image corresponding to the single salient object.

3. The system of claim 1, wherein the at least one processor is further configured cause the system to generate a modified digital image utilizing the refined segmentation map.

4. The system of claim 1, wherein the at least one processor is further configured cause the system to generate a version of the digital image having a reduced-resolution and generate the additional segmentation map and the segmentation map of the region of the digital image comprising the single salient object from the version of the digital image having the reduced-resolution.

5. The system of claim 4, wherein the at least one processor is further configured cause the system to upsample the refined segmentation map from the reduced-resolution to a higher resolution.

6. The system of claim 5, wherein the at least one processor is further configured to cause the system to upsample the refined segmentation map from the reduced-resolution to the higher resolution by applying at least one of a dense conditional random field filter, a guided filter, or a graph cut filter to the refined segmentation map of the sub-region of the region of the digital image.

7. The system of claim 1, wherein utilizing the neural network to refine identification of the pixels corresponding to the single salient object in the sub-region comprises:
   determining confidence values corresponding to the pixels;
   determining that one or more confidence values corresponding to one or more pixels that do not satisfy a threshold condition; and

refining the one or more confidence values utilizing the
    neural network.

8. The system of claim 1, wherein the neural network
comprises a convolution neural network trained to identify
salient objects in digital images.

9. A non-transitory computer readable medium storing
instructions thereon that, when executed by at least one
processor, cause a computing device to perform operations
comprising:

generating, utilizing a neural network, an initial segmen-
        tation map of a digital image that identifies pixels of the
        digital image corresponding to a single salient object
        portrayed in the digital image, the digital image having
        a first resolution;

generating, from a region of the digital image comprising
        the single salient object as indicated in the initial
        segmentation map, a segmentation map of the single
        salient object portrayed utilizing the neural network to
        identify pixels of the digital image corresponding to the
        single salient object in the region of the digital image,
        the initial segmentation map having a second resolution
        corresponding to a predetermined image resolution
        specification of the neural network;

determining whether to perform additional refinement to
        the segmentation map of the region of the digital
        image;

generating, from a sub-region of the region of the digital
        image and based on determining to perform additional
        refinement to the segmentation map, an additional
        segmentation map of the sub-region of the region
        having the second resolution by utilizing the neural
        network to refine identification of the pixels corre-
        sponding to the single salient object in the sub-region;

identifying, based on the additional segmentation map,
        one or more regions of the digital image with confi-
        dence values meeting a threshold condition; and generating a refined segmentation map having the first
        resolution by reprocessing, utilizing the neural net-
        work, the one or more regions of the digital image to
        refine the confidence values meeting the threshold
        condition.

10. The non-transitory computer readable medium of
claim 9, wherein generating the refined segmentation map
by reprocessing, utilizing the neural network, the one or
more regions of the digital image to refine the confidence
values meeting the threshold condition comprises iteratively
applying the neural network to regions of the digital image
with confidence values meeting the threshold condition as
indicated by a prior application of the neural network.

11. The non-transitory computer readable medium of
claim 10, wherein the threshold condition comprises one or
more of:

a predefined number of iterations of applying the neural
        network;

a predefined duration of time; or a threshold convergence of confidence values between
        consecutive iterations.

12. The non-transitory computer readable medium of
claim 9, further comprising instructions that, when executed
by the at least one processor, cause the computing device to
perform operations comprising upsampling the refined seg-
mentation map from a reduced-resolution to a higher reso-
lution.

13. The non-transitory computer readable medium of
claim 12, wherein upsampling the refined segmentation map
from the reduced-resolution to the higher resolution comprises applying at least one of a dense conditional random
field filter, a guided filter, or a graph cut filter to the refined
segmentation map.

14. The non-transitory computer readable medium of
claim 12, wherein upsampling the refined segmentation map
from the reduced-resolution to the higher resolution com-
prises upsampling based on information from a version of
the digital image having the higher resolution.

15. In a digital medium environment for editing high-
resolution digital images, a computer-implemented method
comprising:

receiving user input selecting an option to perform object
        selection on a digital image;

generating, utilizing a neural network, an initial segmen-
        tation map of the digital image that identifies pixels of
        the digital image corresponding to a single salient
        object portrayed in the digital image, the digital image
        having a first resolution;

generating, from a region of the digital image comprising
        the single salient object as indicated in the initial
        segmentation map, a segmentation map of the single
        salient object having a second resolution corresponding
        to a predetermined image resolution specification of the
        neural network by utilizing the neural network to
        identify pixels of the region of the digital image cor-
        responding to the single salient object without receiv-
        ing user input indicating a portion of the digital image
        corresponding to the single salient object;

determining whether to perform additional refinement to
        the segmentation map of the region of the digital
        image;

generating, from a sub-region of the region of the digital
        image and based on determining to perform additional
        refinement to the segmentation map, an additional
        segmentation map of the sub-region having the second
        resolution by utilizing the neural network to refine
        identification of the pixels corresponding to the single
        salient object in the sub-region; and upsampling the additional segmentation map from the
        second resolution to the first resolution.

16. The computer-implemented method of claim 15,
wherein determining whether to perform additional refine-
ment to the segmentation map of the region of the digital
image comprises:

analyzing the segmentation map of the single salient
        object to identify the sub-region of the digital image
        comprising pixels having confidence values, indicating
        whether the pixels belong to the single salient object or
        not, below a threshold value.

17. The computer-implemented method of claim 15, fur-
ther comprising:

generating a version of the digital image with the second
        resolution by downsampling the digital image; and utilizing the version of the digital image with the second
        resolution to generate the segmentation map and the
        additional segmentation map.

18. The computer-implemented method of claim 17,
wherein upsampling the additional segmentation map from
the second resolution to the first resolution comprises
upsampling the additional segmentation map to a resolution
of the digital image prior to the downsampling of the digital
image.

19. The computer-implemented method of claim 15,
wherein upsampling the additional segmentation map from
the second resolution to the first resolution comprises applying at least one of a dense conditional random field filter, a guided filter, or a graph cut filter to the additional segmentation map.

20. The computer-implemented method of claim 15, wherein generating, from the digital image, the segmentation map of the portion of the digital image comprising the single salient object portrayed within the digital image by utilizing the neural network to identify pixels of the digital image corresponding to the single salient object comprises iteratively applying the neural network to regions of the digital image with confidence values meeting a threshold condition as indicated by a prior application of the neural network.

\* \* \* \* \*